United States Patent
Liu et al.

(10) Patent No.: US 11,140,702 B2
(45) Date of Patent: *Oct. 5, 2021

(54) RADIO COMMUNICATION SYSTEM AND COMMUNICATION CONTROL METHOD

(71) Applicant: NEC Corporation, Tokyo (JP)

(72) Inventors: Le Liu, Tokyo (JP); Yoshikazu Kakura, Tokyo (JP); Naoto Ishii, Tokyo (JP); Takamichi Inoue, Tokyo (JP)

(73) Assignee: NEC CORPORATION, Tokyo (JP)

( * ) Notice: Subject to any disclaimer, the term of this patent is extended or adjusted under 35 U.S.C. 154(b) by 32 days.

This patent is subject to a terminal disclaimer.

(21) Appl. No.: 16/358,288

(22) Filed: Mar. 19, 2019

(65) Prior Publication Data

US 2019/0215853 A1    Jul. 11, 2019

Related U.S. Application Data

(63) Continuation of application No. 15/459,410, filed on Mar. 15, 2017, now Pat. No. 10,285,192, which is a continuation of application No. 14/375,521, filed as application No. PCT/JP2012/000558 on Jan. 30, 2012, now Pat. No. 9,634,740.

(51) Int. Cl.
*H04W 72/12*    (2009.01)
*H04J 11/00*    (2006.01)
*H04L 5/00*    (2006.01)
*H04W 48/12*    (2009.01)
(Continued)

(52) U.S. Cl.
CPC ........ *H04W 72/1273* (2013.01); *H04B 7/024* (2013.01); *H04J 11/0053* (2013.01); *H04L 5/0035* (2013.01); *H04L 5/0053* (2013.01); *H04W 48/12* (2013.01);
(Continued)

(58) Field of Classification Search
CPC . H04W 28/10; H04W 28/04; H04W 28/0236; H04W 24/06; H04W 72/1273; H04W 72/1205; H04W 72/1289; H04W 48/12; H04W 84/042; H04J 11/0053; H04L 5/0053; H04L 5/0035; H04B 7/024
See application file for complete search history.

(56) References Cited

U.S. PATENT DOCUMENTS 8,537,862 B2 *  9/2013  Blankenship ......... H04L 1/0004
                                                                 370/483
9,215,035 B2   12/2015  Kim et al.
(Continued)

FOREIGN PATENT DOCUMENTS

WO    WO 2011/085195 A1    7/2011

OTHER PUBLICATIONS

3GPP TSG RAN WG1 #65 R1-111686, "Comparison of CoMP Scenarios 3 and 4", May 2011.
(Continued)

*Primary Examiner* — Jianye Wu

(57) ABSTRACT

A radio communication system includes: a plurality of cells having different scrambling sequences, respectively, wherein at least two cells communicate with at lease two user terminals connected to different serving cells; and a controller which controls the plurality of cells and provides a single scrambling sequence to said at least two cells and said at least two user terminals for control signal transmission and reception.

18 Claims, 21 Drawing Sheets

(51) Int. Cl.
*H04W 84/04* (2009.01)
*H04B 7/024* (2017.01)

(52) U.S. Cl.
CPC ... *H04W 72/1205* (2013.01); *H04W 72/1289* (2013.01); *H04W 84/042* (2013.01)

(56) References Cited

U.S. PATENT DOCUMENTS

| | | | |
|---|---|---|---|
| 2010/0322178 A1 | 12/2010 | Li et al. | |
| 2011/0103250 A1* | 5/2011 | Li | H04L 5/0016 370/252 |
| 2013/0194931 A1 | 8/2013 | Lee et al. | |
| 2013/0195041 A1* | 8/2013 | Papasakellariou | H04L 1/0038 370/329 |
| 2014/0071936 A1 | 3/2014 | Zhang et al. | |
| 2014/0314042 A1* | 10/2014 | Kim | H04L 1/0072 370/329 |

OTHER PUBLICATIONS

3GPP TSG RAN WG1 #66 R1-112049, "Investigation on downlink control channel and signaling enhancements", Aug. 2011.
3GPP TSG RAN WG1 Meeting #66bis R1-112960, "DL Reference Signal Enhancement for CoMP Transmission", Oct. 2011.
3GPP TR 36.819 V1.2.0, $3^{rd}$ Generation Partnership Project, "Coordinated Multi-Point Operation for LTE Physical Layer Aspects", Release 11, Sep. 2011.
3GPP TR 36.913 V9.0.0, $3^{rd}$ Generation Partnership Project, "Requirements for further advancements for Evolved Universal Terrestrial Radio Access (E-UTRA) (LTE-Advanced)", Release 9, Dec. 2009.
3GPP TR 36.211 V10.3.0, $3^{rd}$ Generation Partnership Project, "Evolved Universal Terrestrial Radio Access (E-UTRA); Physical Channels and Modulation", Release 10, Sep. 2011.
3GPP TS 36.212 V10.3.0, $3^{rd}$ Generation Partnership Project, "Evolved Universal Terrestrial Radio Access (E-UTRA); Multiplexing and channel coding", Release 10, Sep. 2011.
International Search Report and Written Opinion dated Mar. 26, 2012.

* cited by examiner

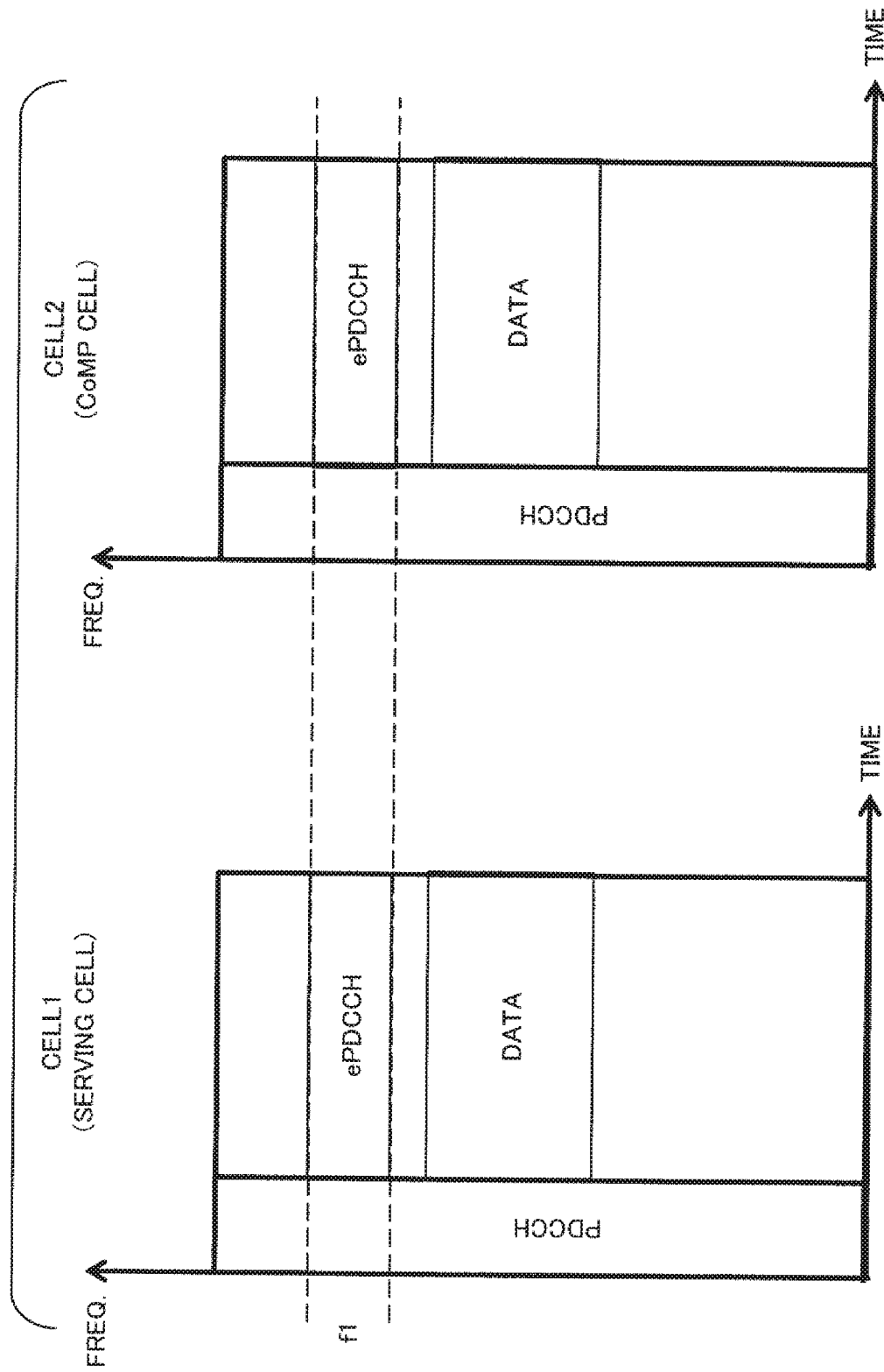

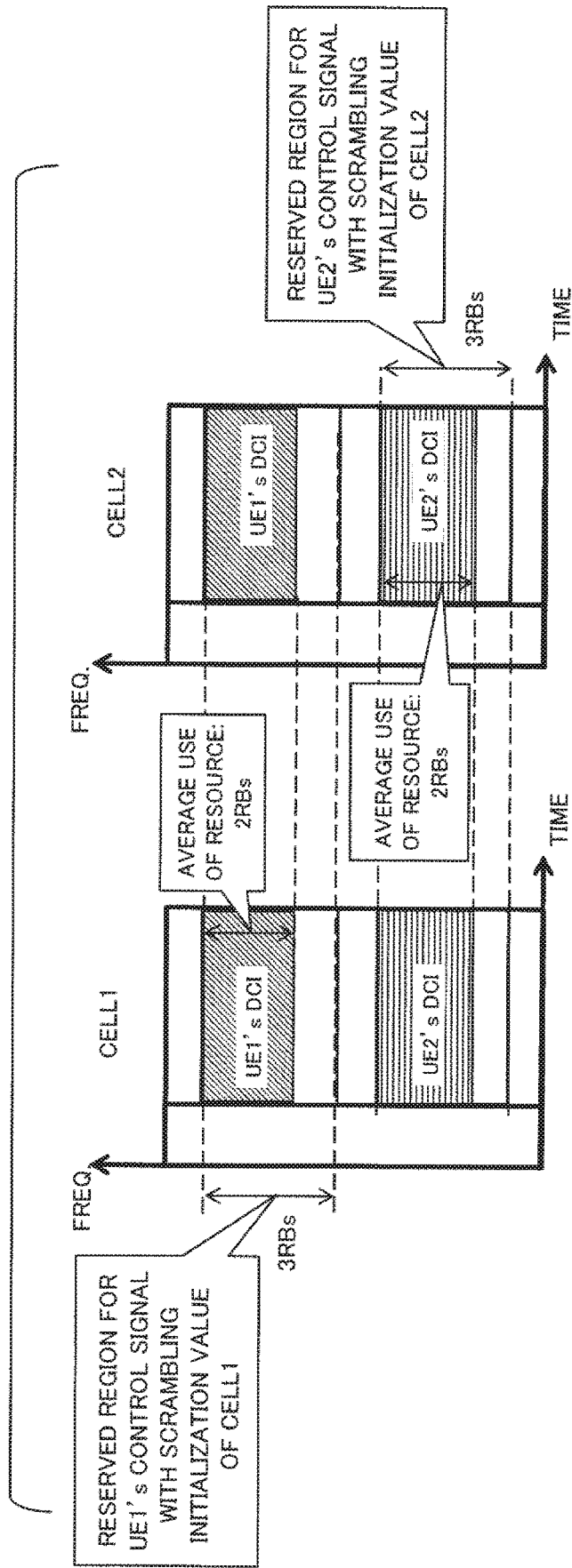

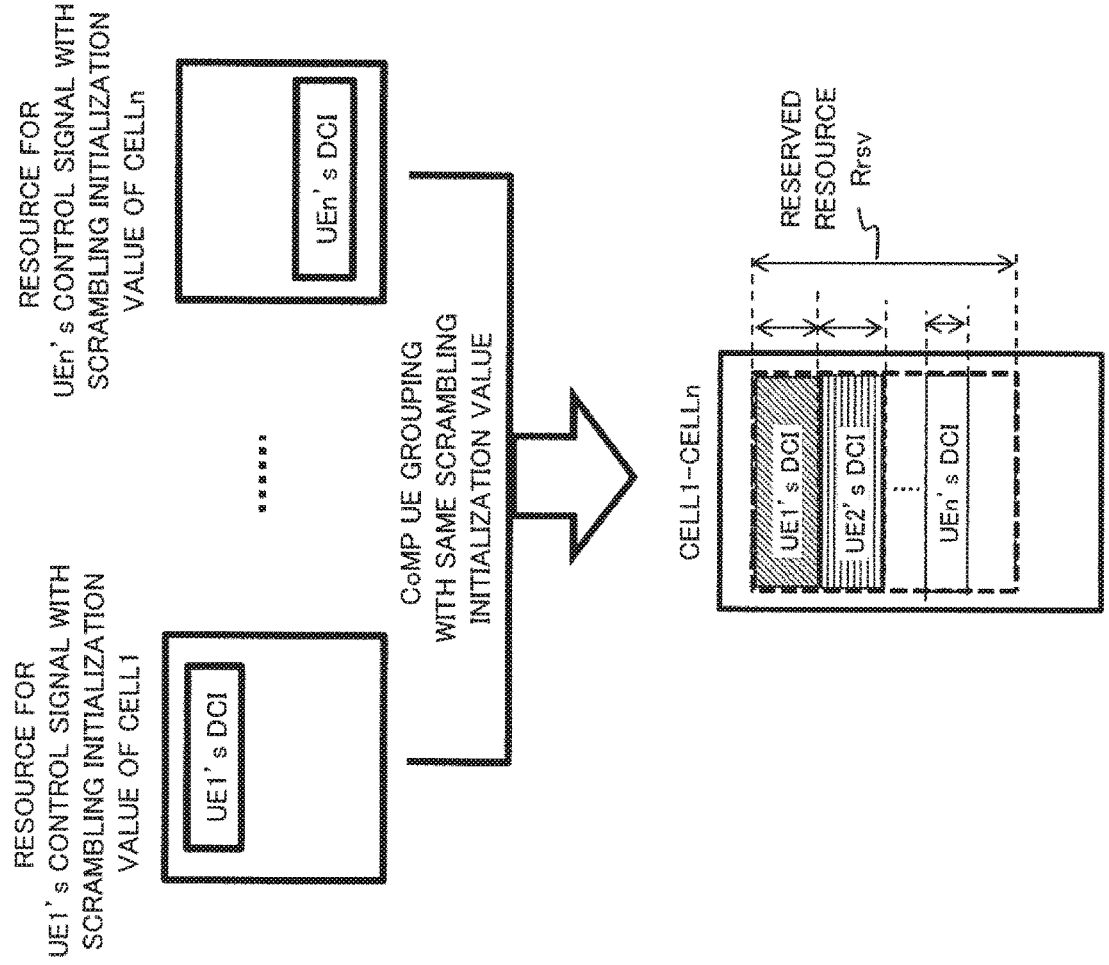

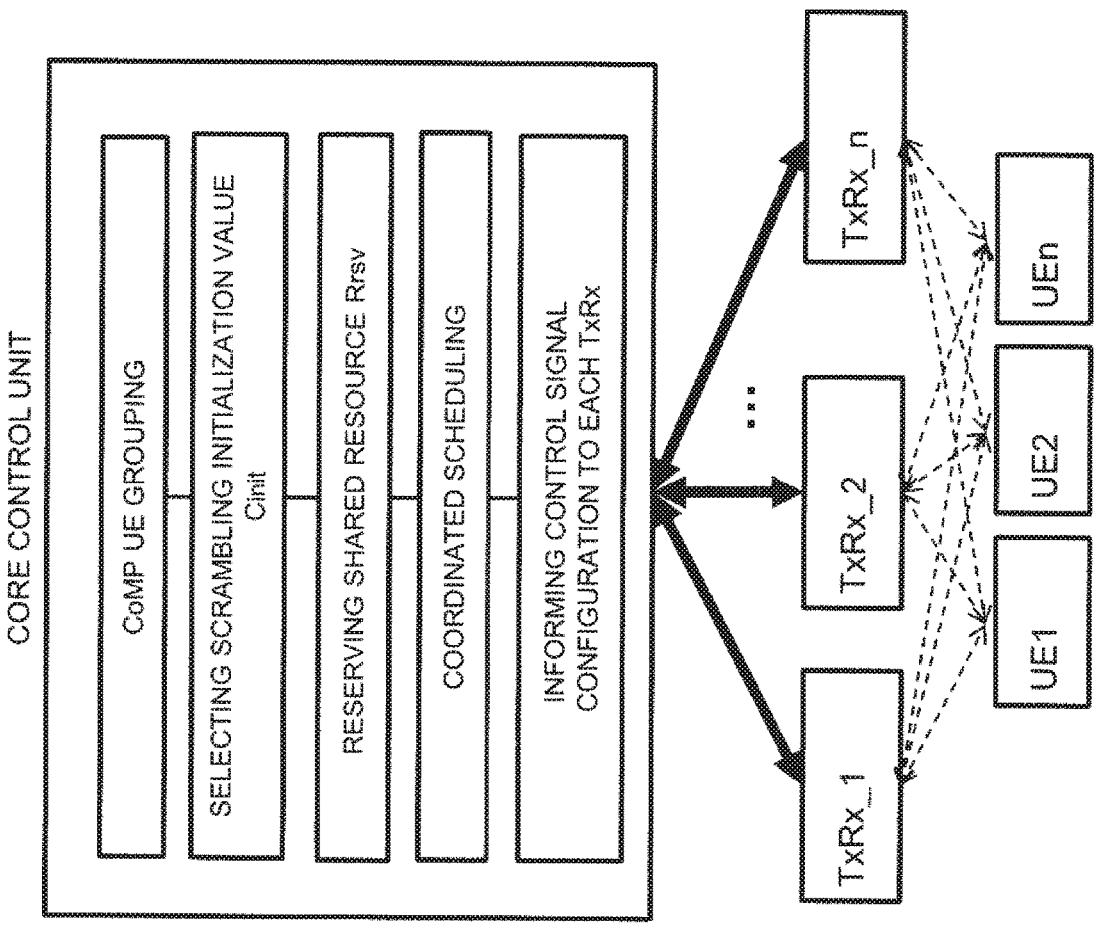

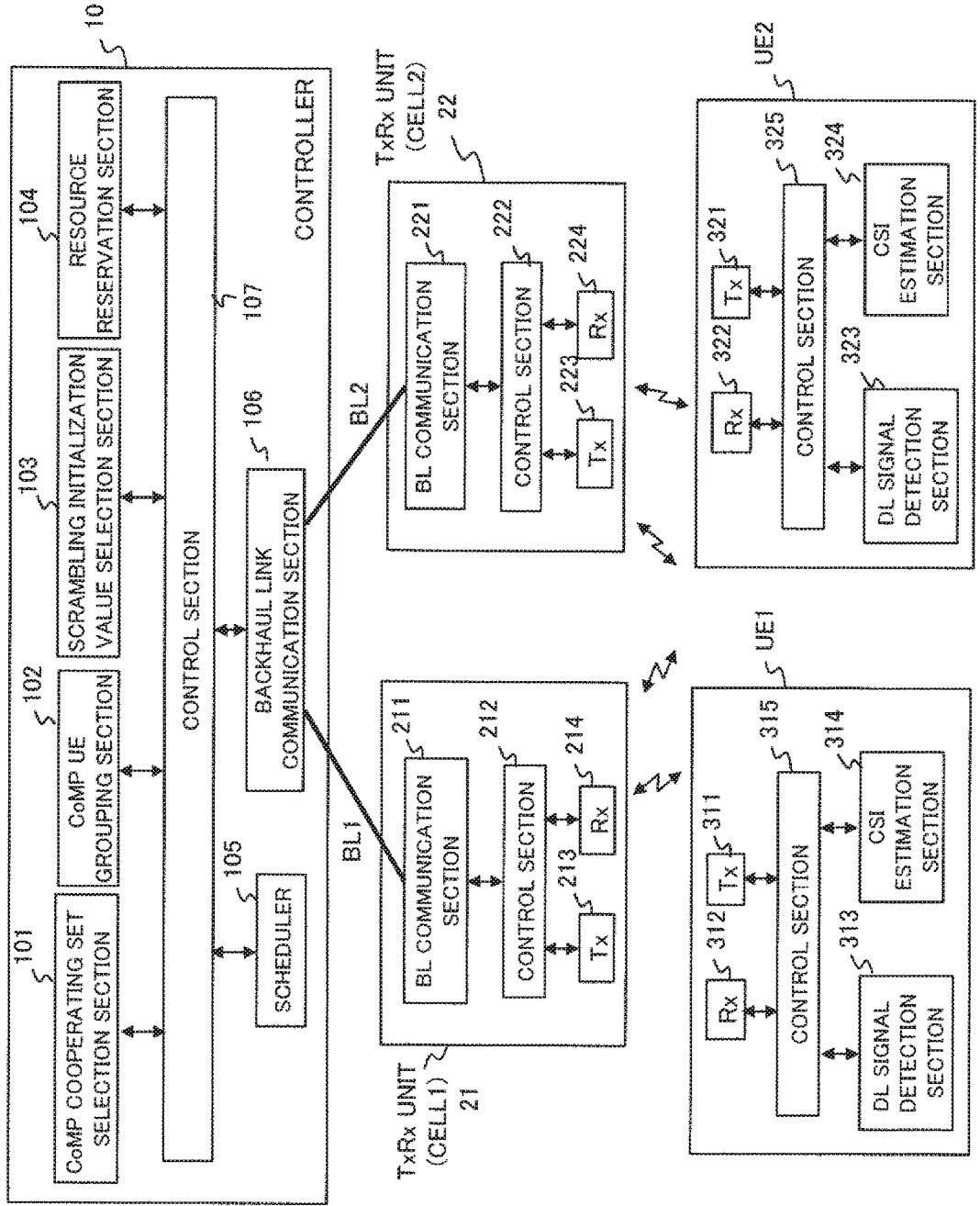

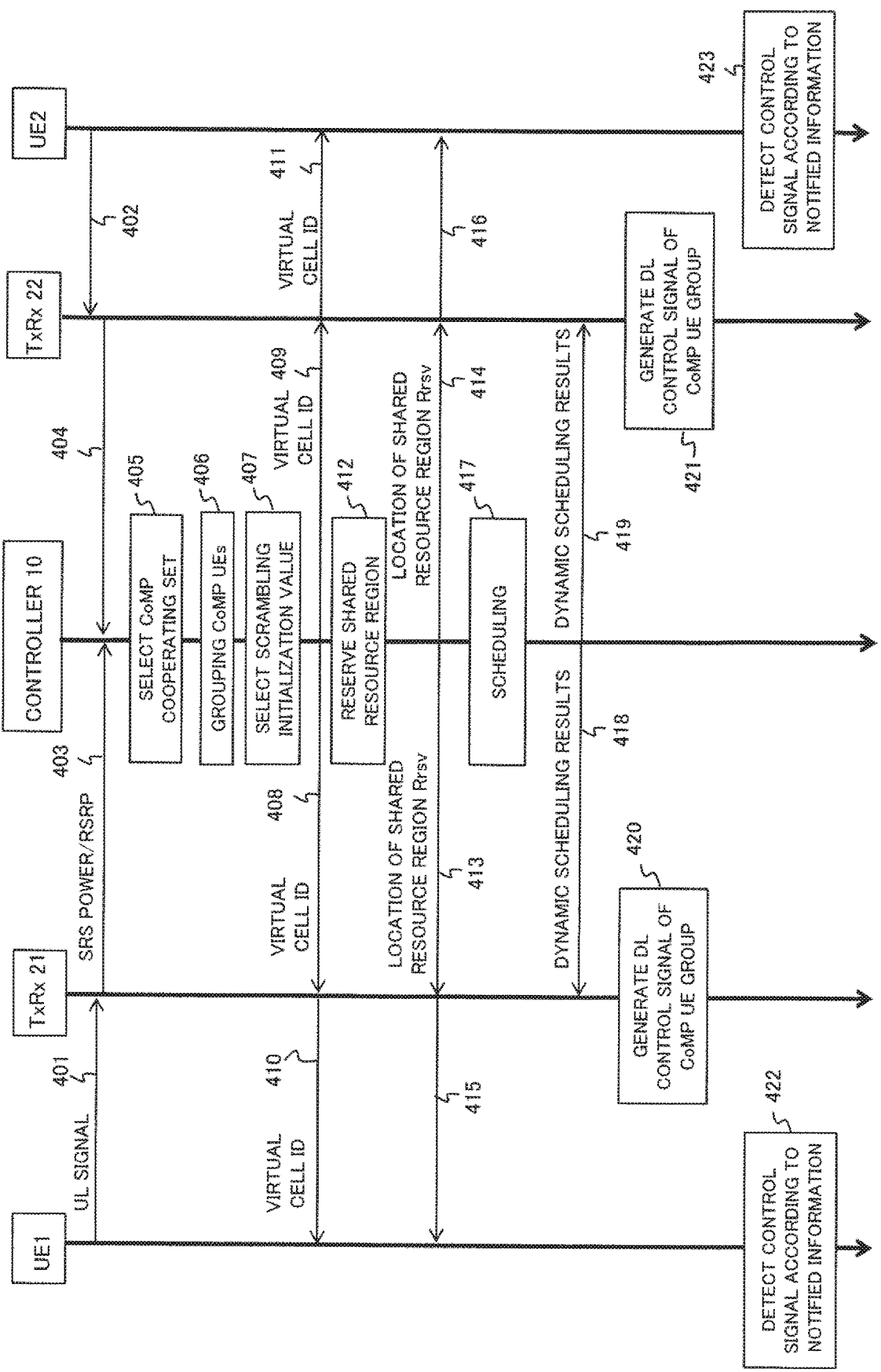

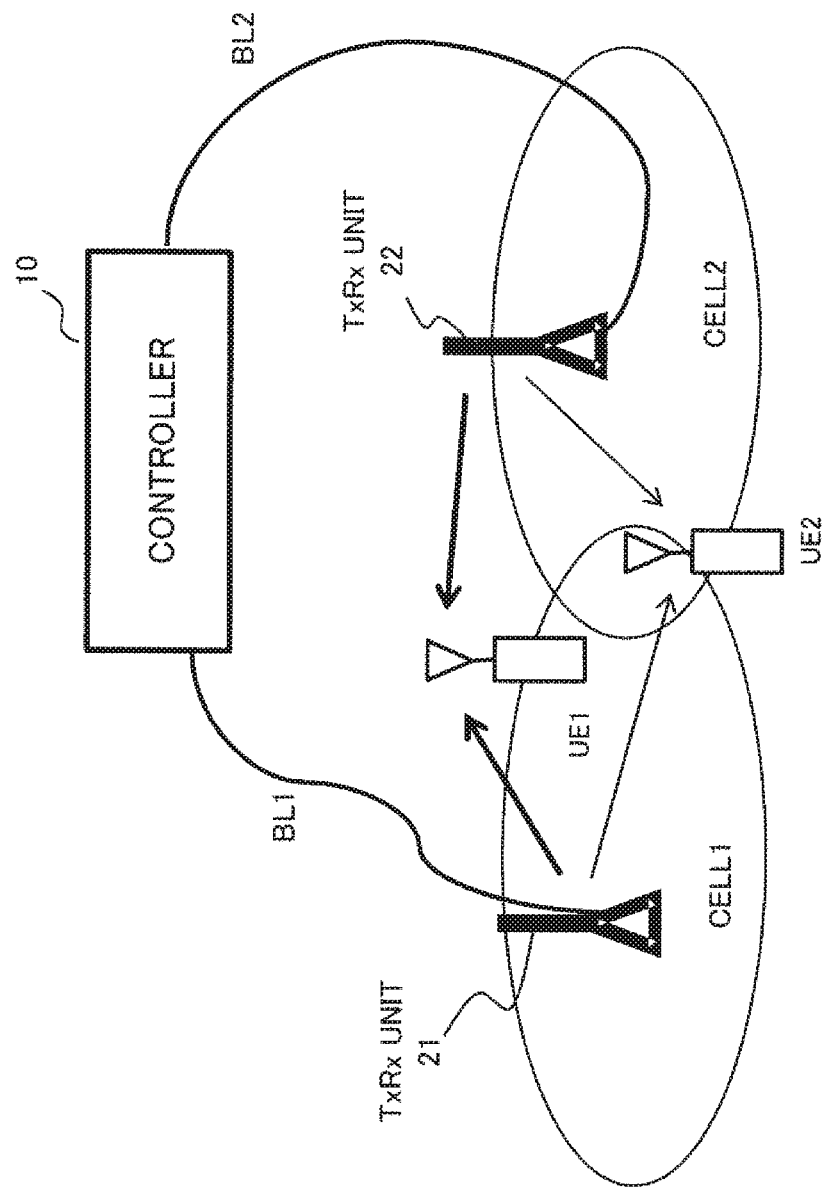

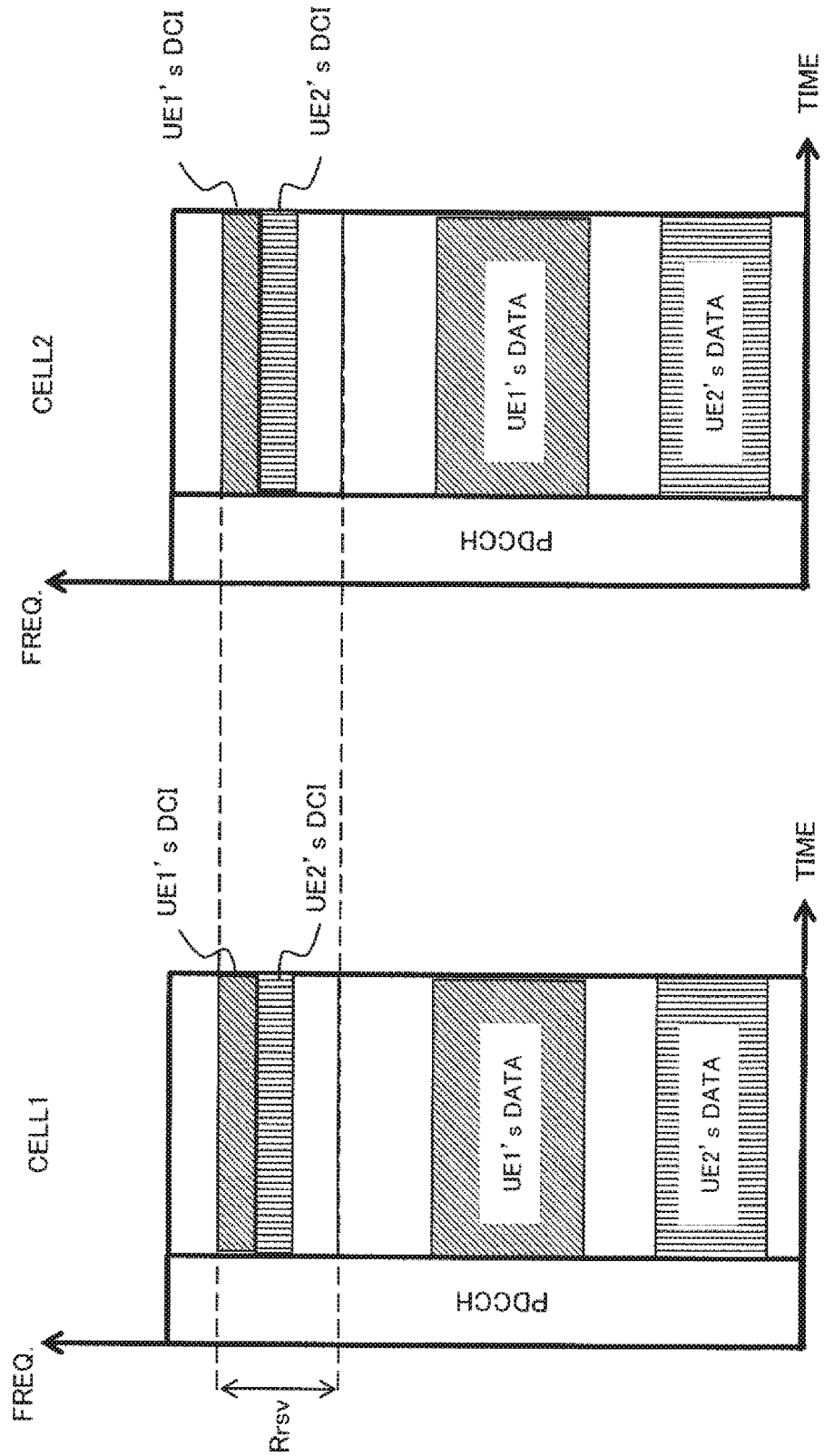

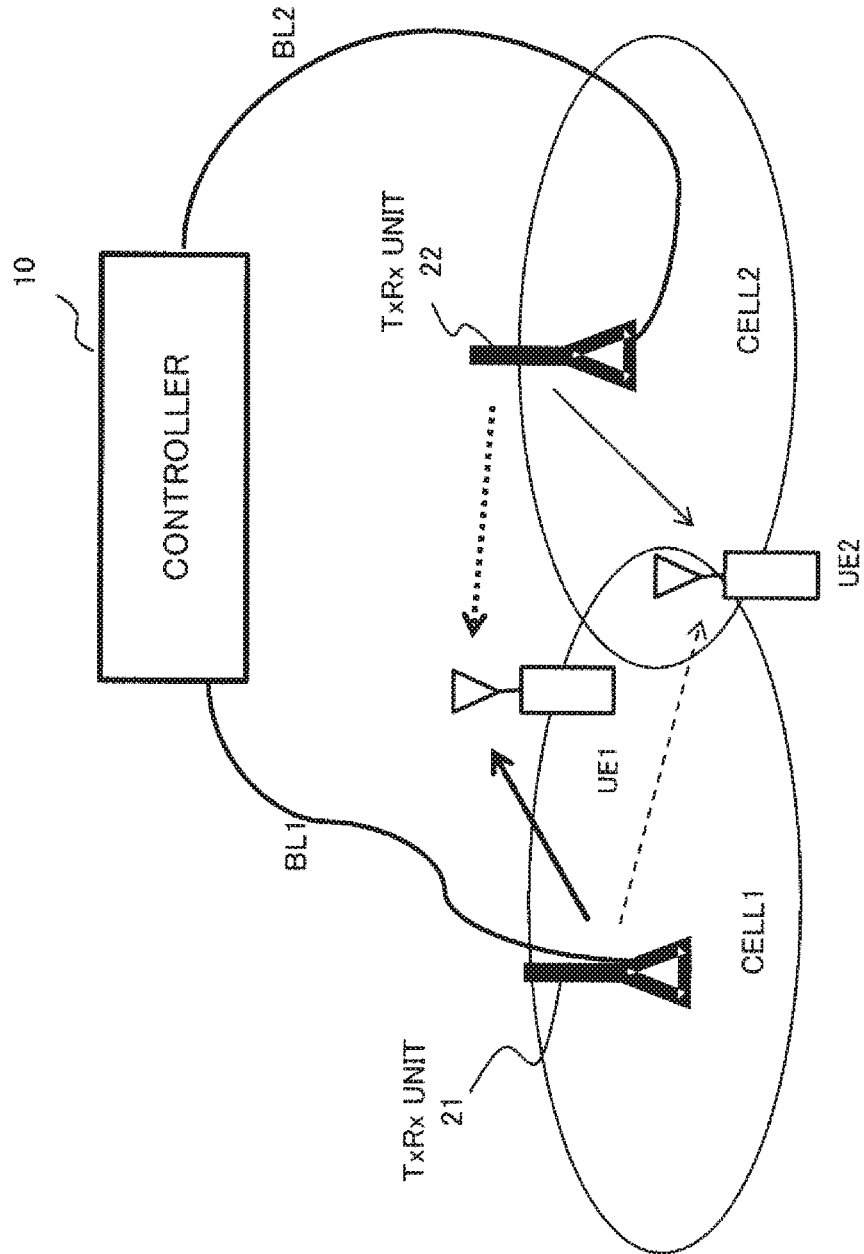

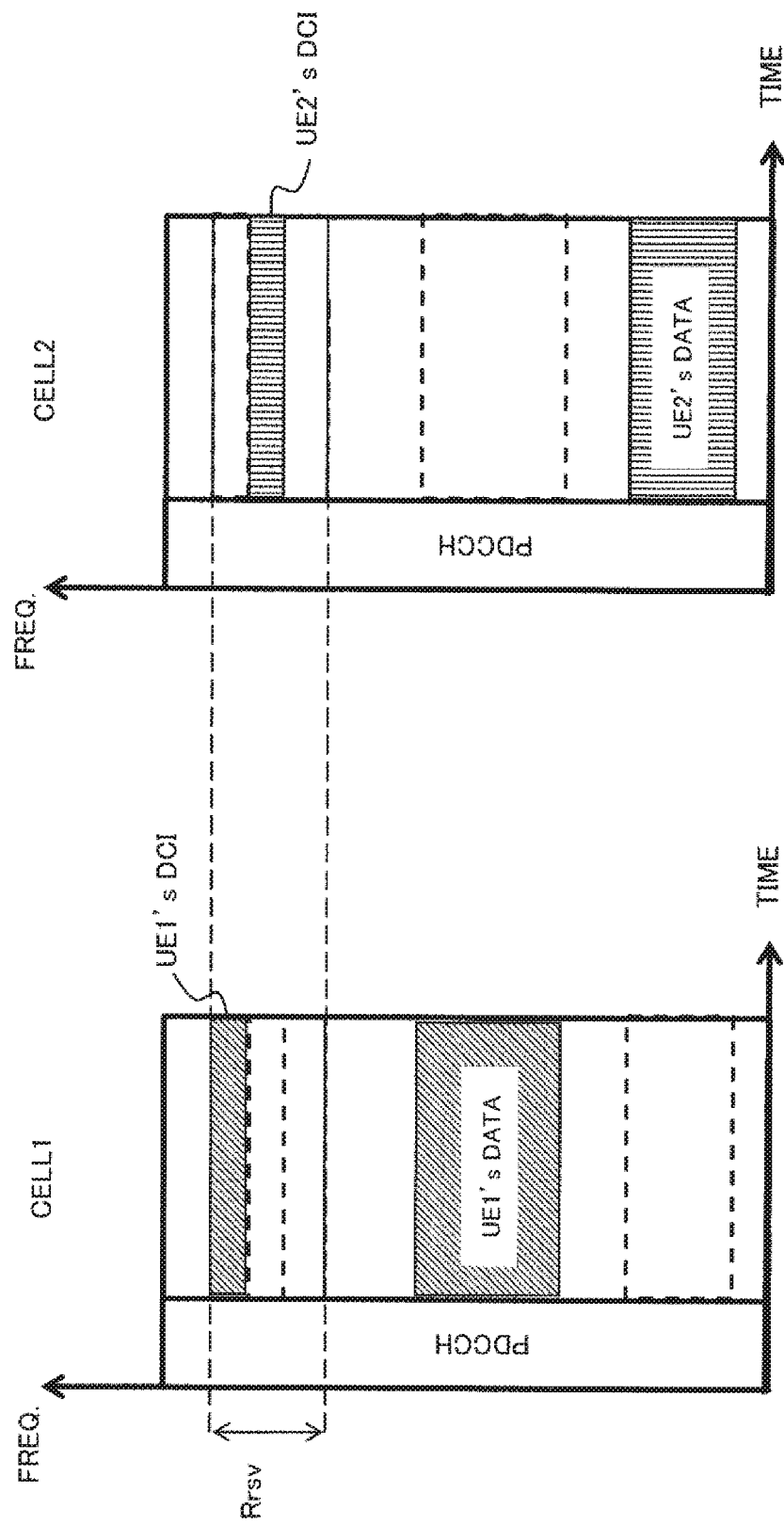

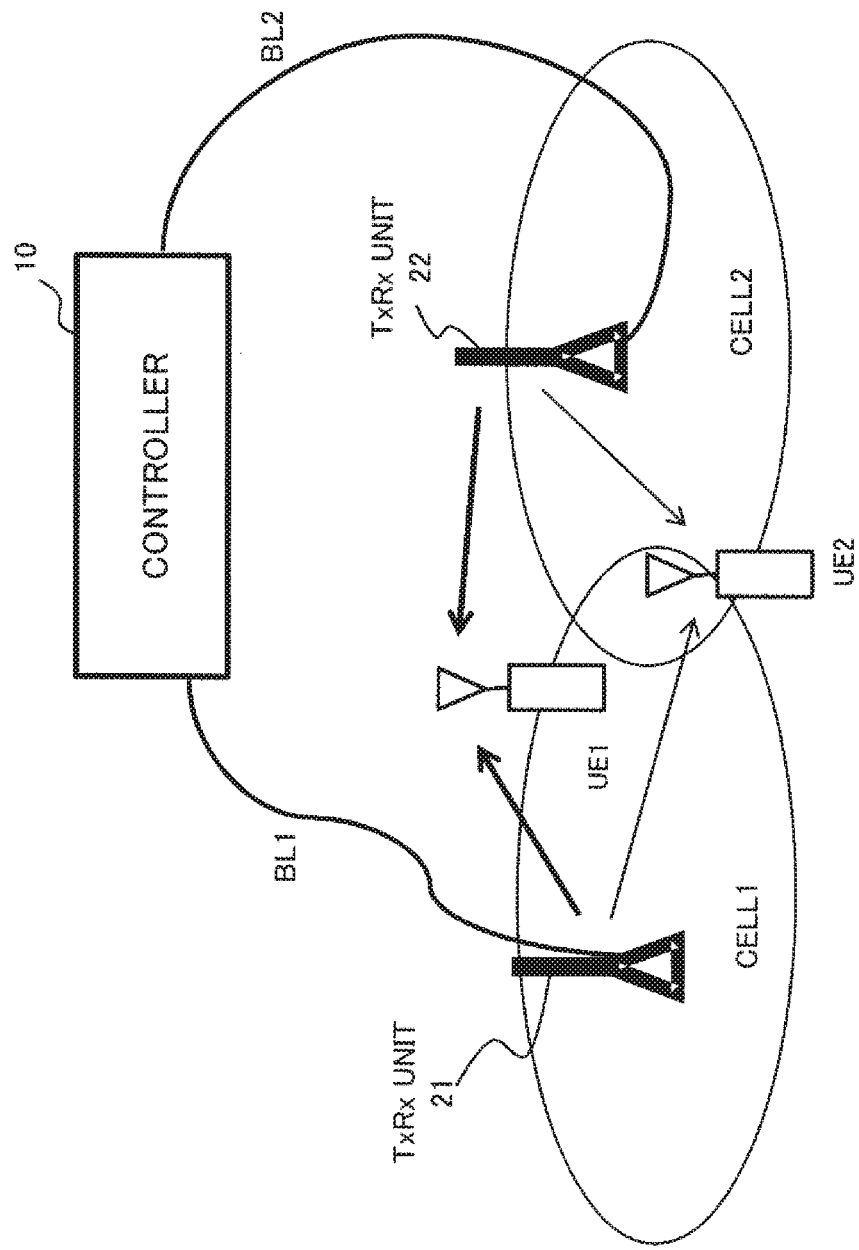

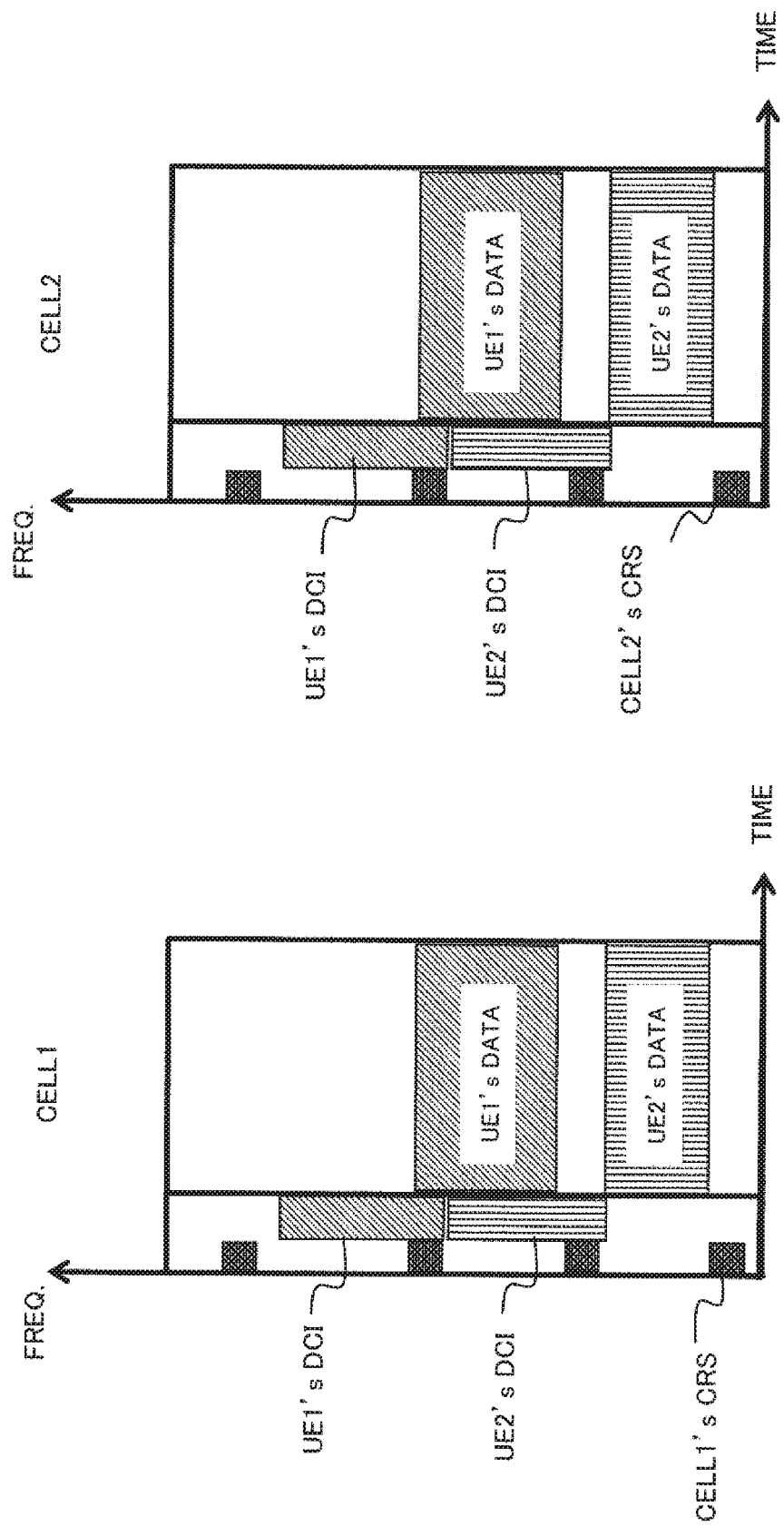

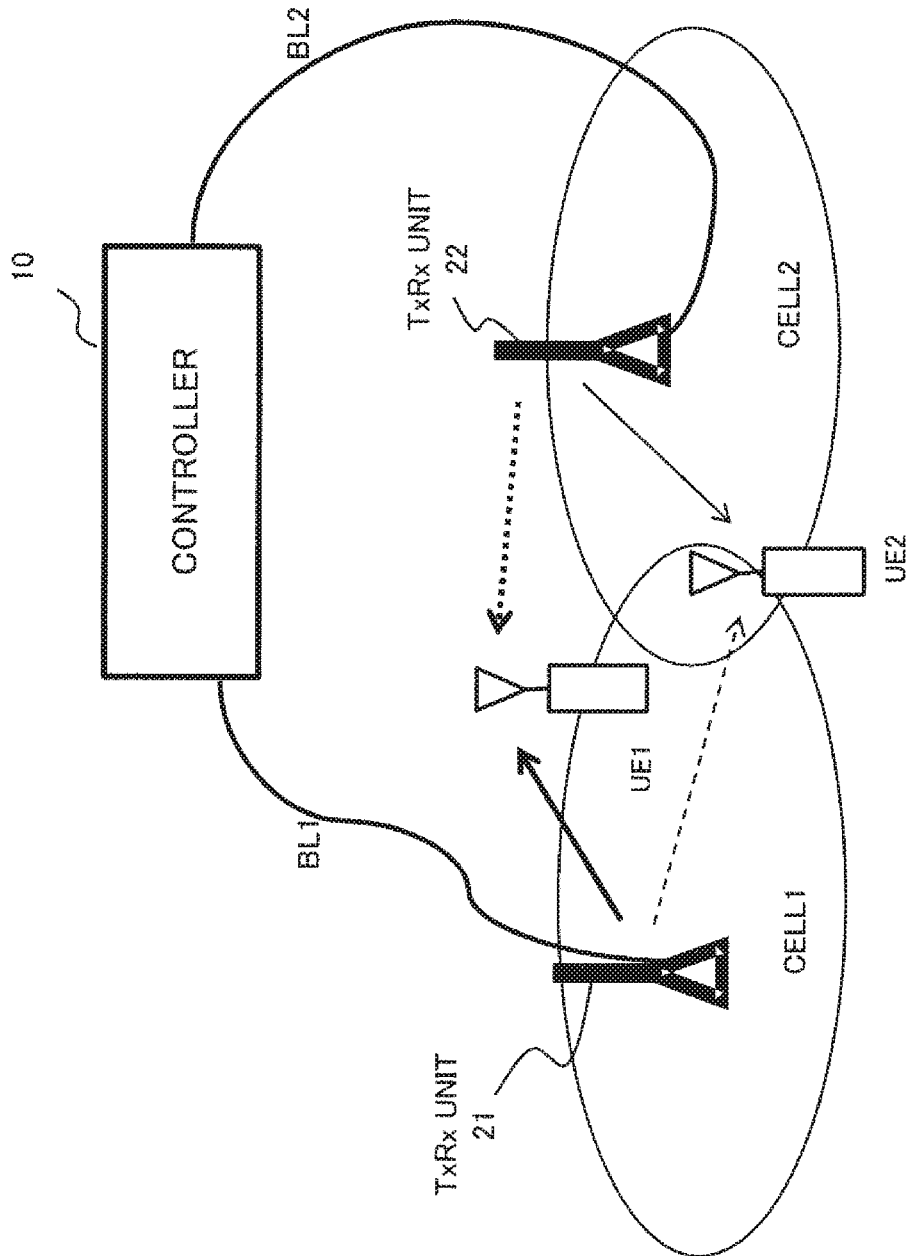

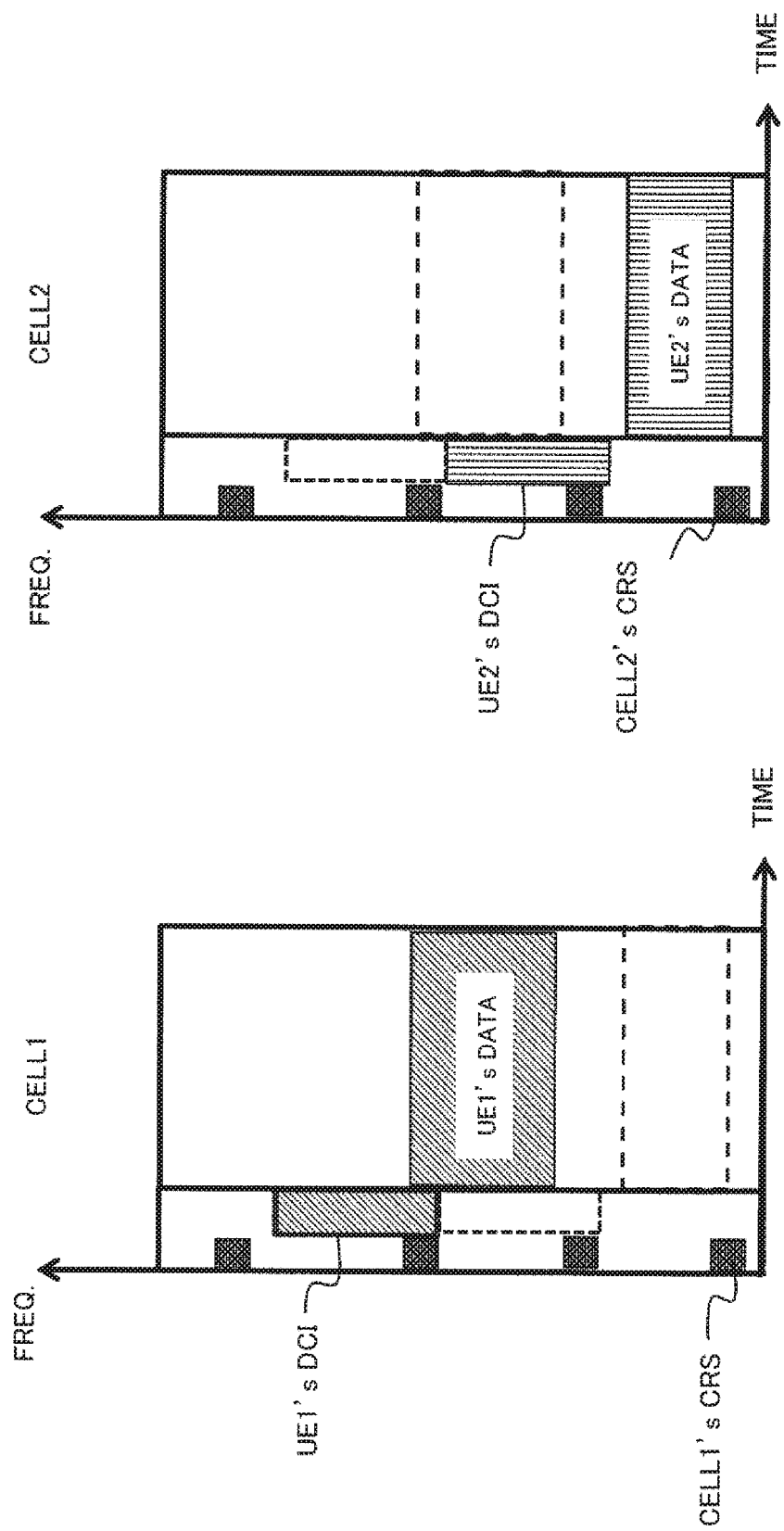

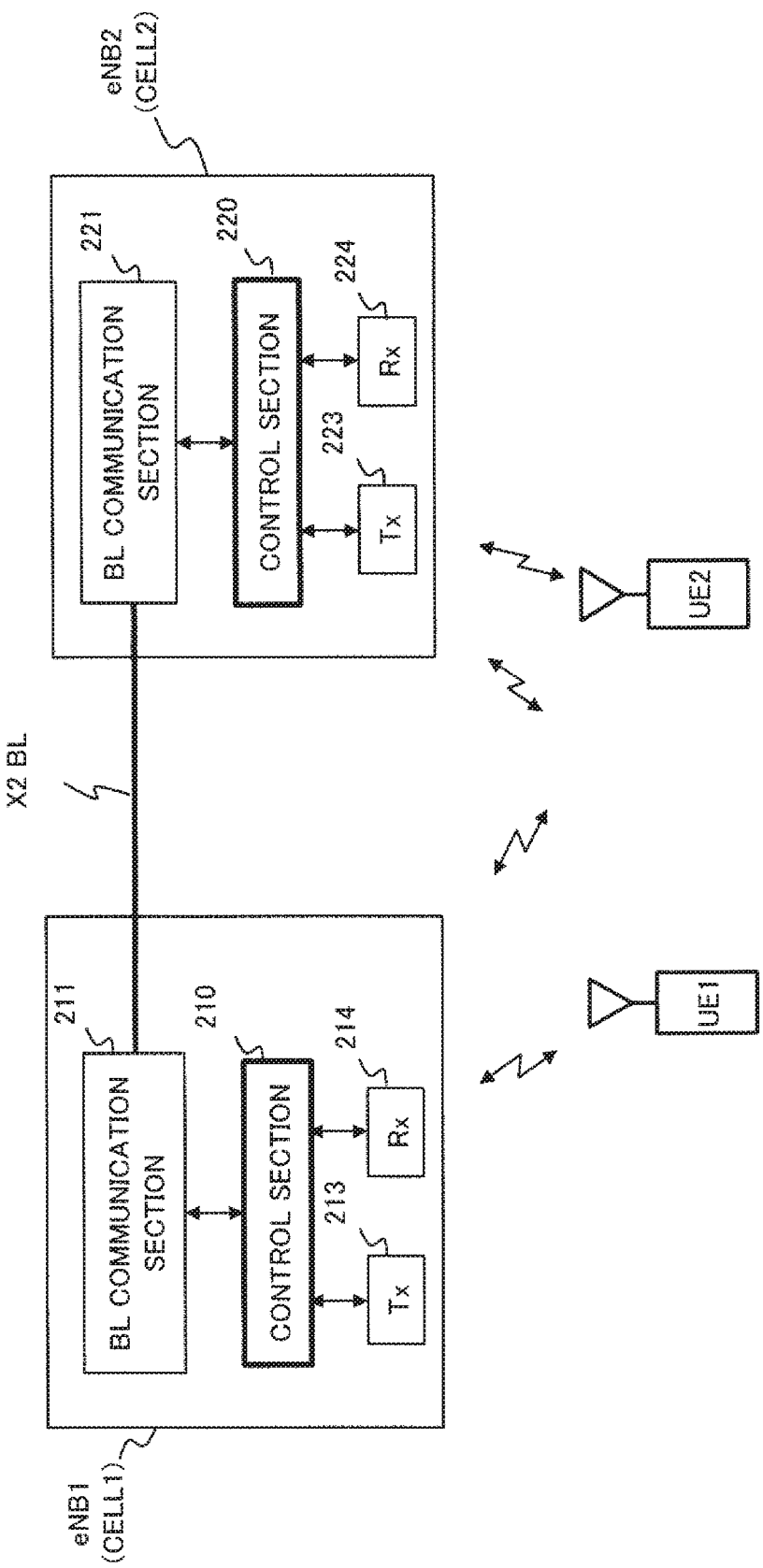

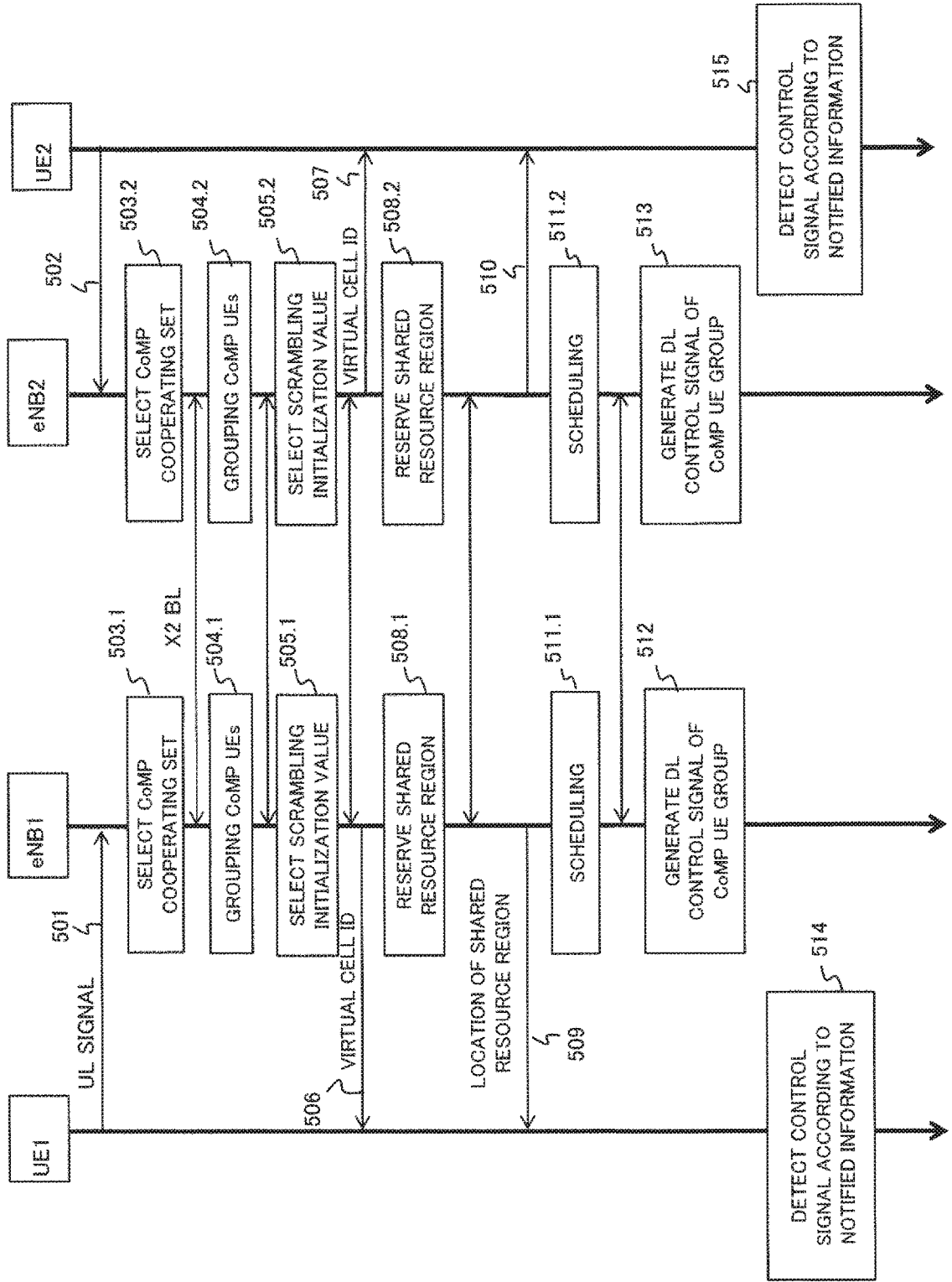

RADIO COMMUNICATION SYSTEM AND COMMUNICATION CONTROL METHOD

CROSS-REFERENCE TO RELATED PATENT APPLICATIONS

This application is a continuation of U.S. patent application Ser. No. 15/459,410, filed Mar. 15, 2017, which is a continuation of U.S. patent application Ser. No. 14/375,521, filed Oct. 29, 2014, which is a National Stage Entry of International Application No. PCT/JP2012/000558, filed Jan. 30, 2012. The entire contents of the above-referenced applications are expressly incorporated herein by reference.

BACKGROUND

Recently, LTE (Long Term Evolution)-Advanced standard has been developed for 4th generation system (4G), where the fairly aggressive target in system performance requirements have been defined, particularly in terms of spectrum efficiency for both downlink (DL) and uplink (UL) as indicated in the Sect. 8 of 3GPP TR 36.913 v9.0.0, Requirements for further advancements for Evolved Universal Terrestrial Radio Access (E-UTRA) LTE-Advanced), December 2009 (hereinafter referred to as "NPL 1"). Considering the target of the cell-edge user throughput and the average cell throughput, which is set to be roughly much higher than that of LTE Release 8 (Rel. 8), multiple techniques, such as carrier aggregation, downlink enhanced MIMO, coordinated multi-point transmission/reception (CoMP), have been included in LTE-Advanced.

In Rel. 8/9/10, the downlink control channel (PDCCCH) is defined to send control signal in Sect. 6.8 of 3GPP TS 36.211 v10.3.0, Physical Channels and Modulation for Evolved Universal Terrestrial Radio Access (E-UTRA) (Release 10) (hereinafter referred to as "NPL2"). Each UE's downlink control information (DCI) is aggregated into consecutive control channel elements (CCEs), where a control channel element corresponds to 9 RE groups as defined in Sect. 6.2.4 of NPL2. The DCI transports downlink or uplink scheduling information, requests for aperiodic CQI reports, notifications of uplink power control commands, etc. as described in the Sect. 5.3.3 of 3GPP TS 36.212 v10.3.0, Multiplexing and channel coding for Evolved Universal Terrestrial Radio Access (E-UTRA) (Release 10) (referred to as "NPL3"). The CCEs of multiple UEs connected to same serving cell are multiplexed and then scrambled by using a scrambling sequence initialized by a value $c_{init}$ at the start of each subframe, which is a function of physical-layer cell identity (ID) of the serving cell as defined in the following equation in the Sect. 6.8.2 of NPL2 for interference randomization. In the following, the initialization value of scrambling sequence generation is called as the scrambling initialization value $c_{init}$ for the sake of convenience.

$$c_{init} = \lfloor n_s/2 \rfloor 2^9 + N_{ID}^{ServCell} \quad \{\text{Math. 1}\}$$

where $n_s$ is the slot number within a radio frame.

The scrambled bit sequence is QPSK (Quadrature Phase Shift Keying)-modulated and mapped to the resource elements of PDCCH. The serving cell reserves a radio resource region for PDCCH of its UEs, i.e., whole bandwidth of first several OFDM symbols (max. 4 OFDM symbols) in a subframe. With the assistance of blind detection at UE side, only the location of the reserved radio resource region is required to be known by UE. The information of the location of the reserved radio resource is dynamically indicated by using L1/L2 signal through such as physical control format indicator channel (PCFICH), defined in the Sect. 6.7 of NPL2.

The present PDCCH, demodulated by cell-specific reference signal (CRS), is sent only by the serving cell and always occupies the entire system bandwidth of the first several OFDM symbols. It is not flexible to tailor the transmission characteristics of PDCCH to an individual UE and also impossible to coordinate transmissions in the frequency domain. This makes PDCCH ill-suited for new deployment, where the notion of a cell is less clear and where flexibility in how to transmit is needed to handle unexpected interference situations. Due to unexpected interferences, PDCCH capacity becomes a bottleneck when applying carrier aggregation, downlink enhanced MIMO and CoMP, etc.

In order to eliminate such a bottleneck, enhanced PDCCH (ePDCCH) has been proposed by R1-113155, Nokia (referred to as "NPL4") and R1-113356, Ericsson, ST-Ericsson (referred to as "NPL5"). As shown in FIG. 1, the ePDCCH is sent over allocated resource blocks (RBs) in physical downlink data channel (PDSCH) area to increase the capacity and coverage of the control signal. The employment of UE-specific RS (DM-RS) in ePDCCH transmission makes the transmission properties transparent to the UE. In principle, the enhanced single-point MIMO as well as multi-point MIMO (i.e., CoMP) schemes for improving the throughput of data transmission becomes also available for the DL control signal transmission, as stated in NPL5. For the blind detection of ePDCCH at UE side, the location of the reserved radio resource region may be informed semi-statically (e.g., 120 ms, 240 ms, etc.) as the information element of E-PDCCH-Config by RRC signaling, similar to the way to inform the configuration of the relay PDCCH (R-PDCCH) as introduced in the Sect. 6.3.2 of 3GPP TS 36.331 v10.3.0, Radio resource control (RRC) and Protocol specification of Evolved Universal Terrestrial Radio Access (E-UTRA) (Release 10) (hereinafter referred to as "NPL6").

For LTE-Advanced Rel. 11, CoMP has been agreed to be included as a tool to improve the coverage of high data rates, the cell-edge throughput, and also to increase system throughput as described in the Sect. 4 of 3GPP TR 36.819 v11.0.0, Coordinated multi-point operation for LTE physical layer aspects (Release 11) (hereinafter referred to as "NPL 7"). The CoMP schemes, joint transmission (JT), dynamic point selection (DPS), and coordinated scheduling/coordinated beamforming (CS/CB) are supposed to be supported as described in the Sect. 5.1.3 of NPL7. The CoMP cooperating set is defined in the Sect. 5.1.4 of NPL7 as a set of (geographically separated) points directly and/or indirectly participating in data transmission to a UE in time-frequency resource. In case of JT and DPS, UE's data, scrambled by a scrambling sequence with the serving cell's scrambling initialization value as defined in the Sect. 6.3.1 of NPL2, should be shared among more than one point in CoMP cooperating set; while, in case of CS/CB, data for a UE is only available at and transmitted from the one point (serving point) but user scheduling/beamforming decisions are made with coordinated among points corresponding to the CoMP cooperating set. It should be noted that the term "point" for coordinated multi-point transmission/reception can be used as a radio station, a transmission/reception unit, remote radio equipment (RRE) or distributed antenna of a base station, Node-B or eNB. Accordingly, hereinafter, a point, a radio station, a transmission/reception unit and a cell may be used synonymously.

According to the performance evaluation results in Sect. 7 of NPL7, JT/DPS CoMP achieves better performance than CB/CS to improve the cell-edge user throughput of downlink data transmission. For a cell-edge UE, which suffers from poor channel condition of serving point and strong interference from CoMP point, JT/DPS CoMP can also be applied to improve the capacity of its control signal in a similar ay as that of data, by sharing not only data but also control signal, scrambled by a scrambling sequence with the serving cell's scrambling initialization value $c_{init}$ among the selected transmission points (TPs).

A simple example of the above-described scheme is given in FIGS. 2A and 2B. Assuming that UE1 and UE2 have Cell1 as serving cell and Cell2 as CoMP cell as shown in FIG. 2A, ePDCCH can aggregate control information of the UE1 and UE2 using the same scrambling sequence for Cell1 and Cell2 as shown in FIG. 2B. As described in Section 6.8.2 of the NPL2, the scrambling sequence generation is initialized with the following initialization value $c_{init}$ determined by the ID of Cell1 (serving cell).

$$c_{init} = \lfloor n_s/2 \rfloor 2^9 + N_{ID}^{Cell1} \quad \{\text{Math. 2}\}$$

In the case of the UE2 with a different serving cell, however, the aggregation of control signal with CoMP cannot be made because different scrambling initialization values and different radio resources are used for the control signals of the UE1 and UE2, respectively. As shown in FIG. 3A, it is assumed that UE1 and UE2 are selected as CoMP UEs with multiple cooperating cells and the UE1 has Cell1 as serving cell and Cell2 102 as CoMP cell; while, the UE2 has Cell2 as the serving cell and Cell1 as the CoMP cell. For the employment of JT/DPS CoMP, the control signal of UE1, scrambled by using the Cell1's scrambling initialization value, is shared by Cell2. On the other hand, the control signal of UE2, scrambled by using the Cell2's scrambling initialization value, is shared by Cell1. Accordingly, the scrambling sequence generation is initialized with different initialization values $c_{init1}$ and $c_{init2}$ for Cell1 and Cell2, respectively:

$$c_{init1} = \lfloor n_s/2 \rfloor 2^9 + N_{ID}^{Cell1} \quad \{\text{Math. 3}\}$$

$$c_{init2} = \lfloor n_s/2 \rfloor 2^9 + N_{ID}^{Cell2}$$

Besides their different scrambling initialization values, different radio resource regions are reserved at Cell1 and Cell2 for sending UE1's and UE2's control signals, respectively as shown in FIG. 3B. Within the previously reserved radio resource region, the occupied resource is dynamically allocated, resulting in remained resource.

In FIG. 3B, as an example, separate resources with max 3RBs for each one are reserved for each UE, but average 2RBs are used for each UEs control signal. As a consequence, an increasing nurnoer of COMP UEs with different serving cells results in larger reserved radio resource regions in multiple cooperating cells.

An object of the present invention is to provide a method and system which can efficiently send control signals with improved capacity and coverage of a control signal for UEs with different serving cells.

SUMMARY

According to the present invention, a radio communication system includes: a plurality of cells having different scrambling sequences, respectively, wherein at least two cells communicate with at lease two user terminals connected to different serving cells; and a controller which controls the plurality of cells and provides a single scrambling sequence to said at least two cells and said at least two user terminals for control signal transmission and reception.

According to the present invention, a method for controlling a plurality of cells having different scrambling sequences in a radio communication system, includes the steps of: setting at least two cells which communicate with at lease two user terminals connected to different serving cells; and providing a single scrambling sequence to said at least two cells and said at least two user terminals for control signal transmission and reception.

According to the present invention, a control device for controlling a plurality of cells having different scrambling sequences in a radio communication system, includes: a setting section for setting at least two cells which communicate with at lease two user terminals connected to different serving cells; and a communication controller for providing a single scrambling sequence to said at least two cells and said at least two user terminals for control signal transmission and reception.

Advantageous Effects of Invention

According to the present invention, the reserved radio resource region for control signals for UEs with different serving cells can be effectively reduced. In addition, the exchanging messages among cooperating cells for the control signal of UEs also become less for coordinating the distributed scheduling results of different cooperating cells.

For a more complete understanding of the present disclosure and its advantages, reference is now made to the following description taken in conjunction with the accompanying drawings, in which like reference numerals represent like parts:

BRIEF DESCRIPTION OF DRAWINGS

FIG. 2B is a schematic diagram illustrating the control signal configuration for each UE in the radio communication system of FIG. 2A.

FIG. 3B is a schematic diagram illustrating the control signal configuration for each UE in the radio communication system of FIG. 3A.

FIG. 4A is a schematic diagra n illustrating control signal configuration for a CoMP UE group for explaining an outline of the present invention.

FIG. 4B is a schematic diagram illustrating the function configuration of a control unit to implement the control signal configuration of FIG. 4A.

FIG. 6 is a diagram illustrating detailed functional configurations of the controller, TxRx units and UEs in the radio communication system of FIG. 5.

FIG. 7 is a sequence diagram illustrating an example of operations of radio communication system of FIG. 6.

FIG. 8A is a schematic diagram illustrating a first example of the radio communication system employing JT CoMP to ePDCCH and PDSCH for UE1 and UE2 according to the first illustrative embodiment.

FIG. 8B is a schematic diagram illustrating the control signal configuration for each UE in the radio communication system of FIG. 8A.

FIG. 9A is a schematic diagram illustrating a second example of the radio communication system employing DPS CoMP to ePDCCH and PDSCH for UE1 and UE2 according to the first illustrative embodiment.

FIG. 9B is a schematic diagram illustrating the control signal configuration for each UE in the radio communication system of FIG. 9A.

FIG. 10A is a schematic diagram illustrating a third example of the radio communication system employing JT CoMP to PDCCH and PDSCH for UE1 and UE2 according to the first illustrative embodiment.

FIG. 10B is a schematic diagram illustrating the control signal configuration for each UE in the radio communication system of FIG. 10A.

FIG. 11A is a schematic diagram illustrating a fourth example of the radio communication system employing DPS CoMP to PDCCH and PDSCH for UE1 and UE2 according to the first illustrative embodiment.

FIG. 11B is a schematic diagram illustrating the control signal configuration for each UE in the radio communication system of FIG. 11A.

FIG. 13 is a diagram illustrating detailed configurations of eNBs in the radio communication system of FIG. 12.

FIG. 14 is a sequence diagram illustrating an example of operations of radio communication system of FIG. 13.

DETAILED DESCRIPTION

Figure 1:
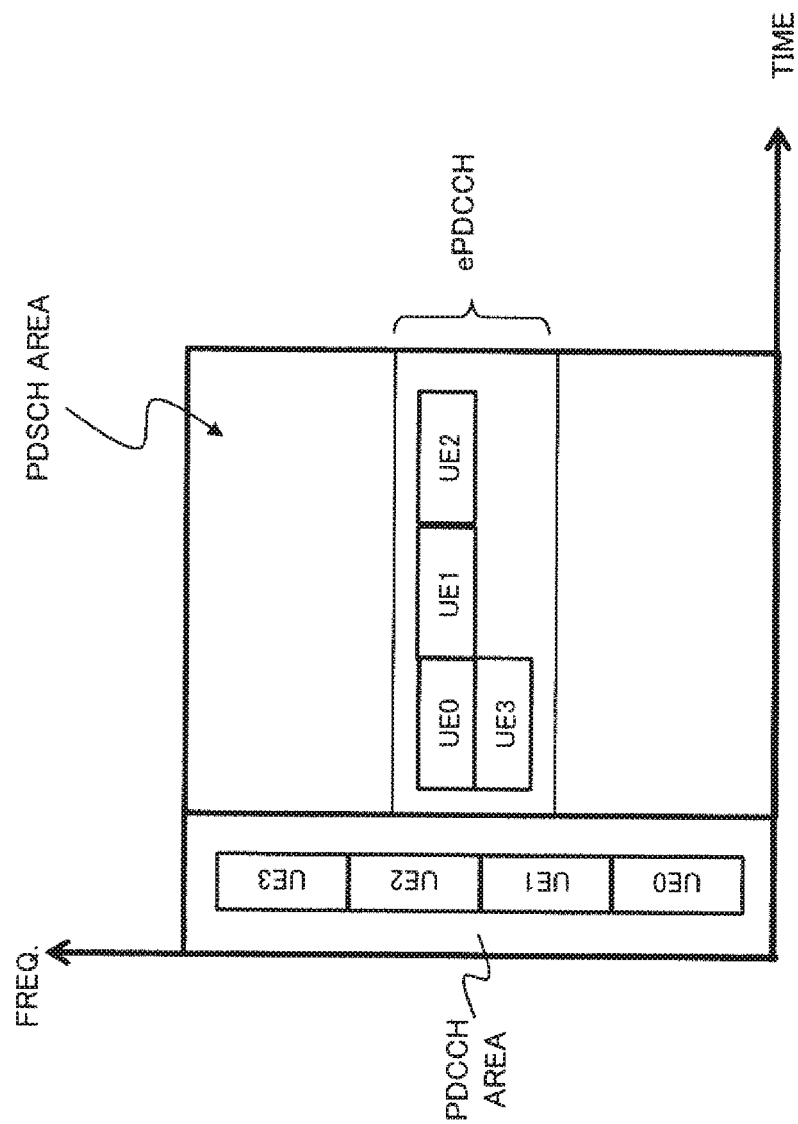
FIG. 1 is a schematic diagram illustrating an example of control signal configuration of PDCCH and enhanced PDCCH (ePDCCH).
Figure 2A:
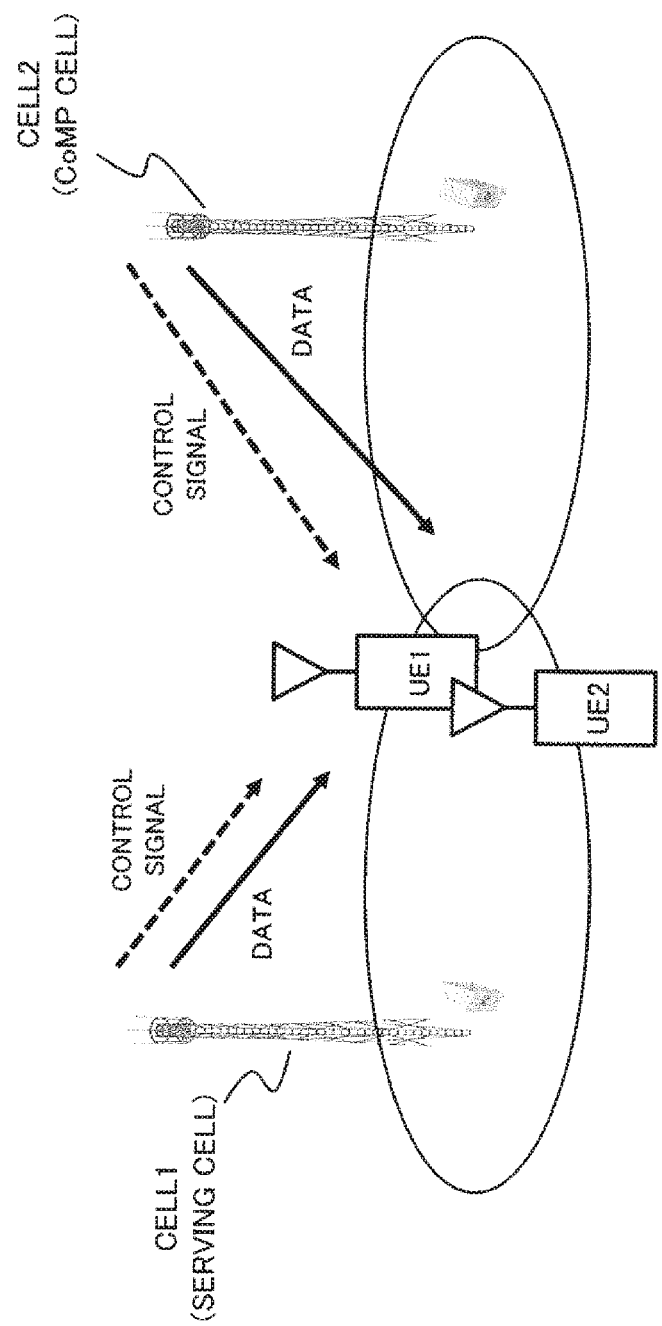
FIG. 2A is a schematic diagram illustrating a radio communication system having two UEs with same serving cell.
Figure 3A:
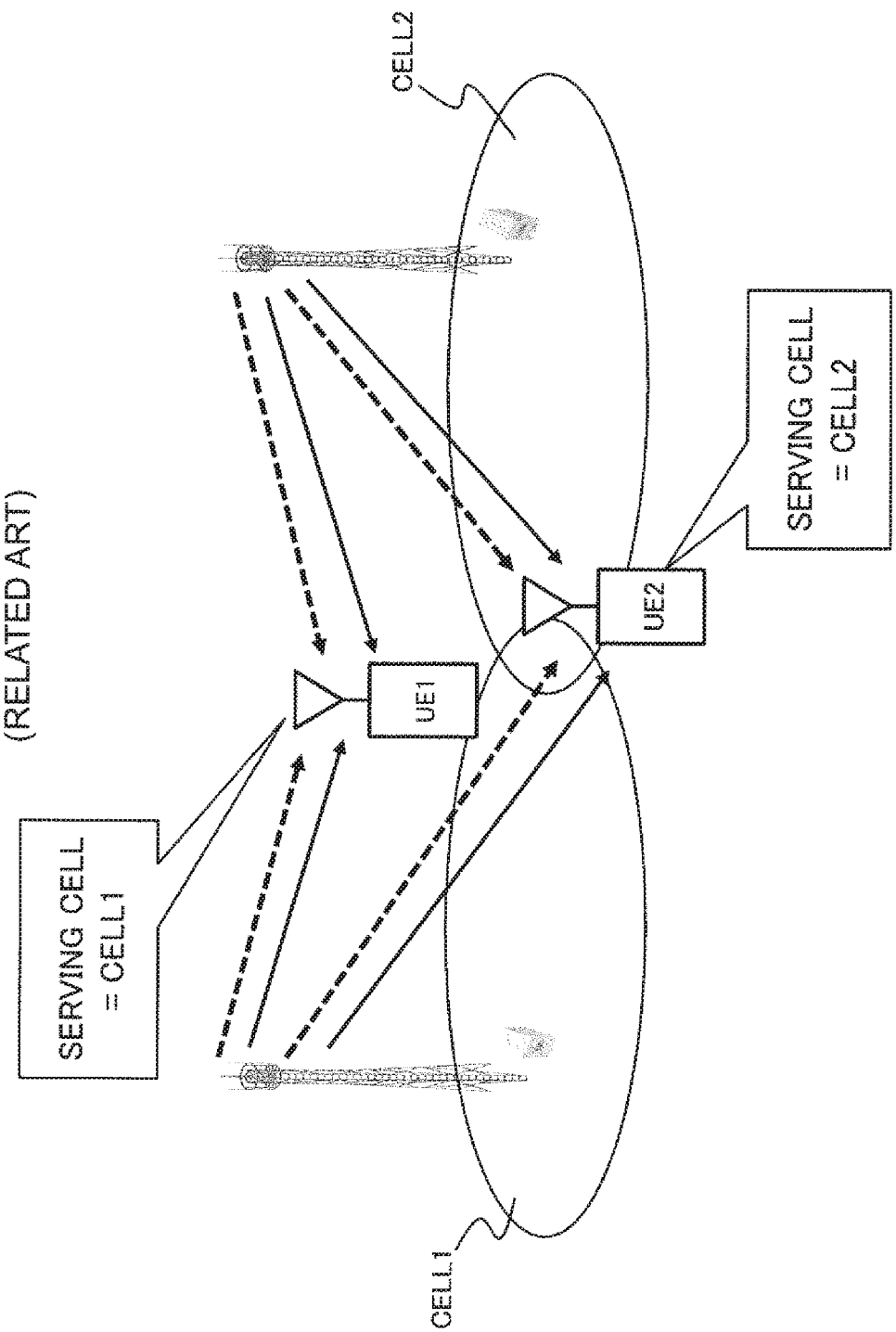
FIG. 3A is a schematic diagram illustrating a radio communication system having two UEs with different serving cells.

First, the general outlines of the present invention will be described with reference to FIGS. 4A and 4B.

As shown in FIG. 4A, multiple UEs (UE1, ... UEn) with the same CoMP cooperating set but different serving cells are aggregated as a CoMP UE group with a single scrambling initialization value which is shared among cooperating cells of the CoMP cooperating set. A reserved resource Rrsv is determined so as to accommodate a total amount of resources for control signals of the UE1-UEn in the CoMP UE group. The respective resources for control signals of the UE-UEn in the CoMP UE group are dynamically allocated within the reserved resource Rrsv and the control signals in the CoMP UE group are scrambled using the single scrambling initialization value.

Referring to FIG. 4B, it is assumed that a core control unit controls radio transmission and reception stations TxRx_1, ... TxRx_n (hereinafter, referred to as TxRx units) which in turn control UE1-UEn with differentving cells corresponding to the TxRx units, respectively. The core control unit performs: grouping the UE1-UEn with different serving cells but the same CoMP cooperating set into a CoMP UE group; selecting the scrambling initialization value for the CoMP UE group; and reserving the shared resource Rrsv as shown in FIG. 4A. Thereafter, the core control unit performs coordinated scheduling and informing control signal configuration to each TxRx unit. In this way, the information elated to the scrambling initialization value and the reserved resource Rrsv is shared among the TxRx units and the UEs for transmitting and receiving control signals.

As an example, considering that UE1 and UE2 are connected to different serving cells (Cell1 and Cell2) but having the same CoMP cooperating set, UE1 and UE2 can be grouped as a CoMP UE group. A common scrambling initialization value is used for initializing the scrambling sequence of their control signal. In addition, the reserved resource region Rrsv for control signal transmission can be set to 5RBs at Cell1 and Cell2, where each UE uses average 2RBs for sending DCI. In this case, the reserved resource region Rrsv is smaller than a total resource (6RBs) for separate control signal transmission of the UE1 and UE2.

The illustrative embodiments will be explained by making references to the accompanied drawings. The illustrative embodiments used to describe the principles of the present invention are by way of illustration only and should not be construed in any way to limit the scope of the disclosure. Those skilled in the art will understand that the principles of the present disclosure may be implemented in any suitably arranged wireless network. In the present technical field related to radio communication systems, the terms "point", "cell", "radio station" and "transmission/reception (TxRx) unit" of a base station (Node-B or eNB) may have same meaning, so serving point and cooperating point can be interpreted as serving cell and cooperating cell, serving TxRx unit and cooperating TxRx unit, or serving radio station and cooperating radio station, respectively. Accordingly, in this disclosure, the term "cell" or "TxRx unit" is used appropriately.

1. First Illustrative Embodiment

According to the first illustrative embodiment, intra-eNB CoMP is applied to control signal transmission. Detailed configuration and operation will be described by referring to FIGS. 5-7.

1.1) System Configuration

Figure 5:
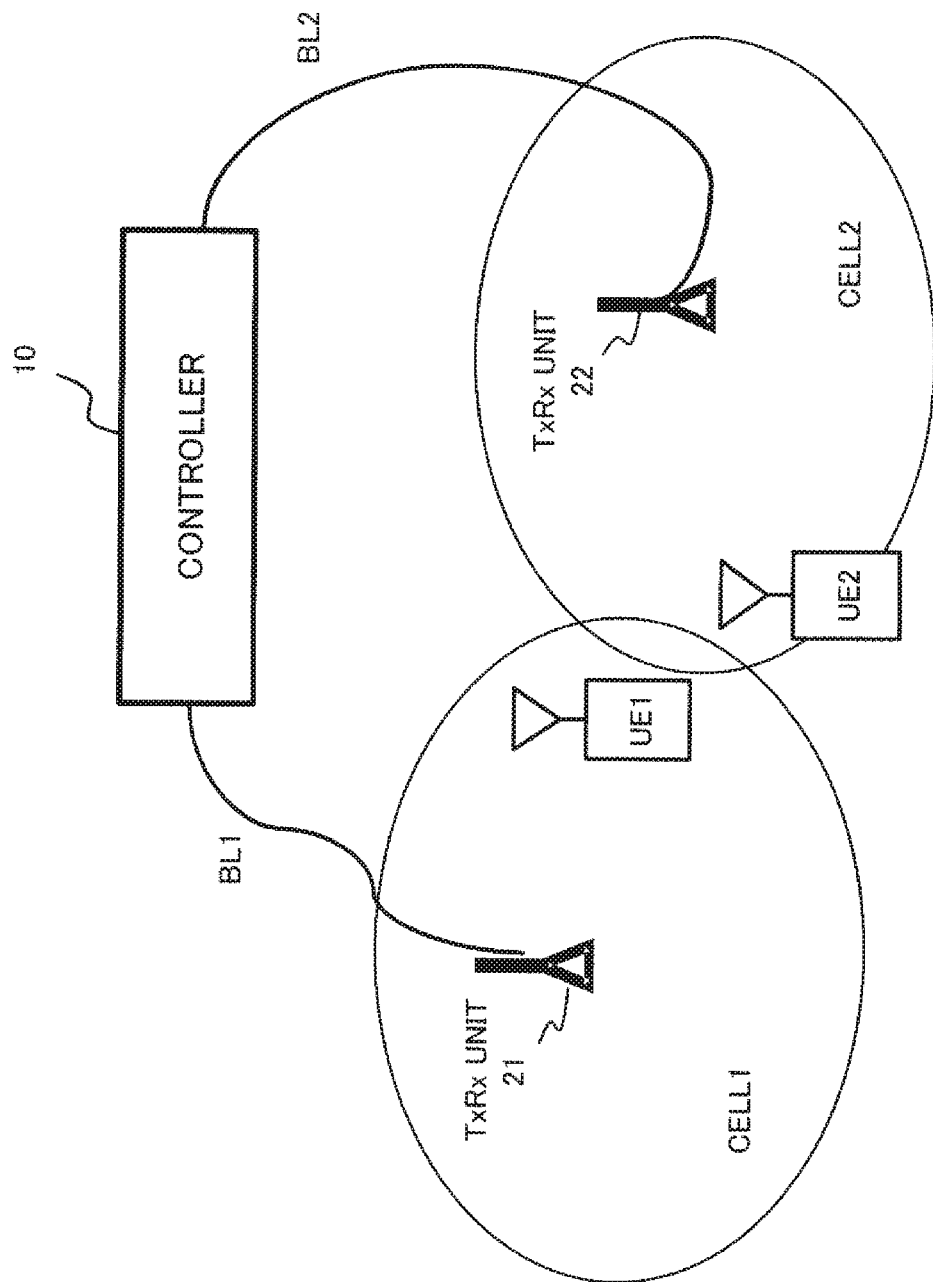
FIG. 5 is a diagram illustrating an example of a radio communication system according to a first illustrative embodiment.

As shown in FIG. 5, it is assumed that a network is composed of a controller 10 and TxRx units 21 and 22 (or Cell1 and Cell2), to which a radio communication system according to the first illustrative embodiment is applied. The controller 10 controls the TxRx units 21 and 22 (or Cell1 and Cell2) through backhaul links BL1 and BL2, respectively. The UE1 and UE2 are communicating with the TxRx units 21 and 22 through radio channels under the control of the network. More detailed configuration of the radio communication system will be described below.

Referring to FIG. 6, the controller 10 includes the function blocks of: CoMP cooperating set selection section 101; CoMP UE grouping section 102; scrambling initialization value selection section 103; resource reservation section 104; scheduler 105; backhaul link (BL) communication section 106; and a control section 107. The TxRx units 21 and 22 have the same functional configuration as follows: BL communication section 211, 221; control section 212, 222; radio transmitter 213, 223; and radio receiver 214, 224. The BL communication sections 211 and 221 are connected to the backhaul link (BL) communication section 106 through the backhaul links BL1 and BL2, respectively, so that data and control signal transmission/reception can be controlled by the controller 10. The UE1 and UE2 have the same functional configuration as follows: radio transmitter 311, 321; radio receiver 312, 322; DL signal detection section 313, 323; channel state information (CSI) estimation section 314, 324; and controller 315, 325. Each cell (TxRx unit 21, 22) in CoMP cooperating set is communicating with the UE1 and UE2, which are also referred to as CoMP UEs.

By using the above-mentioned function blocks, the CoMP cooperating set selection section 101 selects a CoMP cooperating set including more than one cell (here, TxRx units 21 and 22) for each UE (here, UE1, UE2). Thereafter, the CoMP UE grouping section 102 groups the CoMP UEs with the same CoMP cooperating set as a CoMP UE group. For sending the control signal of such a CoMP UE group, the scrambling initialization value selection section 103 chooses a single scrambling initialization value and the resource reservation section 104 reserves the shared radio resource region Rrsv. Next, the scheduler 105 performs the joint scheduling of multiple cells belonging to the CoMP cooperating set, where the network dynamically selects the transmission point(s), TP(s), of TxRx unit(s), and on selected TP(s) allocates the RBs as well as REs within the reserved resource region Rrsv for each UE in the CoMP UE group. In case of precoding at selected TP(s), the precoding matrix index (PMI) as well as rank indicator (RI) for each UE needs to be decided for each selected TP. The detailed process is described as follows.

Referring to FIG. 7, at first, when the TxRx units 21 and 22 have received an uplink signal from the UE1 and UE2, respectively (operations 401 and 402), the control sections 212 and 222 transmits information indicating the received power of uplink sounding reference signal (SRS) or the UE feedback downlink reference signal received power (RSRP) to the controller 10 through the BL communication section 211 and 221 (operations 403 and 404). Based on the information indicating SRS power or the RSRP, the CoMP cooperating set selection section 101 selects the CoMP cooperating set for each UE (operation 405). For example, a cell, whose RSRP difference relative to that of the serving cell is within a threshold, will be regarded as a CoMP cell. The UE having more than one cooperating cell is regarded as a cooperating cell (CoMP cell). It is found that UE1 and UE2 are CoMP UEs, who have the same CoMP cooperating set consisting of Cell1 and Cell2, although UE1's serving cell is Cell1 and UE2's serving cell is Cell2.

The CoMP UE grouping section 102 groups UE1 and UE2 into one CoMP UE group (operation 406). For this CoMP UE group, the scrambling initialization value selection section 103 selects a single scrambling initialization value for the scrambling sequence of control signal, e.g., PDCCH or ePDCCH (operation 407). The scrambling initialization value can be determined by the ID of one CoMP cooperating cell, i.e., Cell1's ID or Cell2's ID, or a different ID for the sake of interference randomization. For example, the scrambling sequence is initialized as a common initialization value $c_{init}$ for Cell1-Celln as follows:

$$c_{init} = \lfloor n_s/2 \rfloor 2^9 + N_{ID}^{VIRTUAL} \quad \{\text{Math. 4}\}$$

where $N_{ID}^{VIRTUAL}$ is a specific virtual cell ID for the CoMP UE group.

$$c_{init} = \lfloor n_s/2 \rfloor 2^9 + N_{ID}^{ServCell} + N_{ID}^{VIRTUAL} \quad \{\text{Math. 5}\}$$

where $N_{offset}$ is the ID offset for each UE belong to the CoMP UE group. $N_{offset}$ is adjusted to obtain same $c_{init}$ for each UE in CoMP UE group.

The control section 107 sends the virtual cell ID or cell ID offset, parameter of scrambling initialization value $c_{init}$, to the TxRx units 21 and 22 (operations 408 and 409) for generating the CoMP UE group's control signal, and the TxRx units 21 and 22 further send it to the UE1 and UE2 as the information element of PDCCH-Config or E-PDCCH-Config by RRC signaling for detecting the control signal, respectively (operations 410 and 411).

Next, the resource reservation section 104 reserves the shared radio resource region Rrsv (see FIG. 4A) at both Cell1 and Cell2 for applying JT/DPS CoMP to control signal transmission (operation 412). The control section 107 notifies the TxRx units 21 and 22 of the location of the shared radio resource region Rrsv (operations 413 and 414)), which further send it to the UE1 and UE2 (operations 415 and 416).

According to the feedback CSI by UE, the scheduler 105 firstly carries out channel-dependent scheduling for data transmission and thereafter each UE's DCI including dynamic scheduling results can be aggregated into consecutive CCEs (operation 417). For each UE in the CoMP UE group, the control section 107 selects transmission points (TxRx units) and allocates RBs and REs within the reserved radio resource region Rrsv. In case of precoding, the PMI as well as RI for each selected TP of the CoMP UE are also decided, respectively. For control signal transmission, besides the virtual cell ID or cell ID offset for scrambling initialization value $c_{init}$, the control section 107 also informs each selected TxRx unit, through a corresponding backhaul link, of dynamic scheduling results which includes the aggregated CCE number, the positions of allocated RBs and REs as well as PMI and RI for precoding (operations 418 and 419).

The virtual cell ID or cell ID offset for generating the scrambling initialization value $c_{init}$ of the CoMP UE group may be indicated semi-statically, e.g., 120 ms, 240 ms, etc.; while, the dynamic scheduling results need to be updated more frequently, e.g., with a period of 5 ms, 10 ms, etc. Accordingly, each of the control sections 212 and 222 generates the control signal of the CoMP UE group by multiplexing the CCEs of the UE1's DCI and UE2's DCI at first and then scrambling the bit sequence by using the scrambling initialization value $c_{init}$ with the informed virtual cell ID or cell ID offset (operations 420 and 421). After that, the transmitter 213, 223 of a corresponding TxRx unit modulates the scrambled bit sequence and maps the modulated signal on the allocated REs within the allocated RBs to send the control signal of the CoMP UE group.

As described above, for control signal detection at UE side, the control section 107 informs each UE in the CoMP UE group of the virtual cell ID or cell ID offset for generating the scrambling initialization value $c_{init}$ as well as the location of the reserved radio resource region Rrsv. The signal related to the virtual cell ID or cell ID offset of the scrambling initialization value $c_{init}$ and the signal related to the location of reserved radio resource region Rrsv may be sent simultaneously or independently. For example, the information of the scrambling initialization value $c_{init}$ together with the location of reserved radio resource region Rrsv may be included in the information elements of PDCCH-Config or E-PDCCH-Config by RRC signaling and semi-statically indicated through PDSCH of serving cell with a period of 120 ms, 240 ms, etc. At the UE side, the blind detection within the informed reserved region Rrsv is carried out to detect the control signal. In another way, the location of radio resource region Rrsv may be dynamically sent to the UE by using L1/L2 signal with a period of 5 ms, 10 ms, etc., independently from that of the scrambling initialization value $c_{init}$. For example, for PDCCH, the reserved region Rrsv is the first several OFDM symbols and the number of the OFDM symbols for PDCCH is dynamically informed to UE by using the L1/L2 signal through PCFICH, which includes the information of the length of Rrsv for PDCCH. For ePDCCH, the start position of ePDCCH can be semi-statically informed by using RRC signal and the length of Rrsv for ePDCCH can be dynamically informed to UE by using the L1/L2 signal though enhanced PCFICH at the beginning of ePDCCH, which carries the information of the length of the ePDCCH resource. Or, the dynamic signaling of the region Rrsv for ePDCCH is informed to UE through its serving cell's PDCCH. In this case, the UE firstly detects the PDCCH to obtain the location of the region Rrsv and then detects the ePDCCH within the region Rrsv. Thereafter, the blind detection may be avoided at the price of larger signaling overhead for the information in PDCCH. The detailed examples are given below.

With the knowledge of the virtual cell ID or cell ID offset for scrambling initialization value cnit and the reserved resource region Rrsv, the DL signal detection section 313, 323 of each UE can detect the control signal, by demapping the received signal, demodulating the symbol sequence, and then descrambling the bit sequence (operations 422 and 423). Hereafter, the UE1's DCI and UE2's DCI are blindly detected in the informed reserved resource region Rrsv, respectively.

According to each UE's DCI associated with the downlink transmission, the CSI estimation section 314, 324 can further detect its received downlink data in PDSCH as well as the downlink reference signal for CSI estimation. According to the UE's DCI associated with the uplink transmission, the control section 315, 325 generates the uplink data and sends over physical uplink shared channel (PUSCH) from each UE's transmitter 311, 321. In addition, the control section 315, 325 generates the feedback CSI together with other uplink control information and sends over physical uplink control channel (PUCCH).

1.2) First Example

A first example of the communication control method according to the first illustrative embodiment shows the case of ePDCCH with JT CoMP, which will be described by referring to FIGS. 8A and 8B.

As shown in FIG. 8A, JT CoMP is applied to send ePDCCH of CoMP UE group from multiple selected TPs (TxRx units 21 and 22). Here, JT CoMP is also applied to data transmission over PDSCH for UE1 and UE2. The TxRx units 21 and 22 (Cell1 and Cell2) are the selected TPs, simultaneously transmitting both data and control signal to UE1 and UE2. For ePDCCH, a common scrambling initialization value $c_{init}$ is needed and a common radio resource region Rrsv is reserved for UE1 and UE2.

As shown in FIG. 8B, over eserved resource region Rrsv, same RBs as well as REs are allocated for each UE's DCI at both Cell1 and Cell2 (TxRx units 21 and 22). In case of preceding of joint transmission, the PMI and RI at Cell1 and Cell2 need to be decided based on the UE feedback CSI. For ePDCCH generation, the information of the common scrambling initialization value $c_{init}$ and the above dynamic scheduling results is indicated to each selected TxRx unit over a corresponding backhaul link BL. For ePDCCH detection, only the information related to the common scrambling initialization value $c_{init}$ (i.e., virtual cell ID or cell ID offset for the CoMP UE group) together with the location of reserved resource region Rrsv is needed for the sake of blind detection at the UE side.

1.3) Second Example

A second example of the communication control method according to the first illustrative embodiment shows the case of ePDCCH with DPS, which will be described by referring to FIGS. 9A and 9B.

As shown in FIG. 9A, DPS CoMP is applied to send ePDCCH of the CoMP UE group from one dynamically selected TP (TxRx unit). The process is similar to that of ePDCCH with JT CoMP given in FIGS. 8A and 8B, except that only one TP(TxRx unit) is dynamically selected for sending PDSCH and ePDCCH. Although the common radio resource region Rrsv is reserved at both Cell1 and Cell2 (TxRx units 21 and 22), the control section 107 only allocates RBs and REs within the reserved radio resource region Rrsv at each UE's selected TP (TxRx unit).

As shown in FIG. 9B, the UE1's data and DCI is sent from the TxRx unit 21 (Cell1); while the UE2's data and DCI is sent from the TxRx unit 22 (Cell2) at a current subframe. In another subframe, it is possible that the UE1's data and DCI is sent from the TxRx unit 22 (Cell2) but the UE2's data and DCI is sent from TxRx unit 21 (Cell1). The selected TP (TxRx unit) may be dynamically updated with a period of 5 ms, 10 ms, etc. For ePDCCH generation, the information related to the common scrambling initialization value $c_{init}$ and the above dynamic scheduling results are indicated to the UE's selected TP (TxRx unit) over a corresponding backhaul link BL. For ePDCCH detection at the UE side, only the information of the common scrambling initialization value $c_{init}$ and the location of reserved resource region Rrsv are needed.

As illustrated in above example of ePDCCH with JT/DPS CoMP, only the location of reserved resource region Rrsv needs to be informed to UE semi-statically for blind detection of control signal. It is also possible to semi-statically inform the start position of ePDCCH but dynamically send the length of reserved resource region Rrsv, such as the number of RBs for Rrsv, in a L1/L2 signal through such as enhanced PORCH (ePCFICH), which carries information about the number of RBs, used for transmission of ePDCCH in a subframe. To avoid blind detection, the aggregation level (i.e., number of aggregated CCEs) and the position of the allocated RBs and/or REs may be informed directly by using a L1/L2 signal over PDCCH, at the price of higher signaling overhead.

1.4) Third Example

A third example of the communication control method according to the first illustrative embodiment shows the case of PDCCH with JT CoMP, which will be described by referring to FIGS. 10A and 10B.

As shown in FIG. 10B, JT CoMP is applied to send PDCCH of the CoMP UE group from multiple selected TPs (TxRx units 21 and 22). The process is similar to that of ePDCCH with JT CoMP given in FIGS. 8A and 8B, except that the allocated resources are restricted to the first several OFDM symbols in case of PDCCH. Since the CRS and PCFICH with cell-specific shift occupy the REs also in the first OFDM symbols, the UE1's DCI and UE2's DCI may be mapped to the REs without conflict with the CRS and PCFICH of Cell1 and Cell2. For PDCCH generation, the virtual cell 10 or cell ID offset for common scrambling initialization value $c_{init}$, the OFDM index as well as the aggregation level and the position of allocated RBs/REs for each UE needs to be known at each selected TP (TxRx unit). For PDCCH detection, the virtual cell ID or cell ID offset for common scrambling initialization value $c_{init}$ is informed semi-statically to each UE of PDCCH-Config or EPDCCH-Config by RRC signaling; while, the location of the reserved resource region Rrsv is indicated dynamically through PCFICH, which carries information about the number of OFDM symbols, used for transmission of PDCCH in a subframe. As shown in FIG. 10B, the data and DCI of UE1 and UE2 are simultaneously transmitted by Cell1 and Cell2 (TxRx units 21 and 22) over allocated RBs and REs in the shared reserved OFDM symbols. The UE1 and UE2 can detect its own DCI by blind detection within the informed region Rrsv of PDCCH.

1.5) Fourth Example

A fourth example of the communication control method according to the first illustrative embodiment shows the case of PDCCH with DPS, which will be described by referring to FIGS. 11A and 11B.

As shown in FIG. 11A, DPS CoMP is applied to send PDCCH of the CoMP UE group from a dynamically selected TP (TxRx unit). The process is similar to that of PDCCH with JT CoMP given FIGS. 10A and 10B, except that only one TP (TxRx unit) is dynamically selected in a subframe for sending PDSCH and PDCCH. Although the common radio resource region Rrsv is reserved at both Cell1 and Cell2 (TxRx units 21 and 22), the control section 107 only allocates the RBs and REs within the reserved radio resource region Rrsv at each UE's selected TP (TxRx unit).

As shown in FIG. 11B, the UE1's data and DCI is sent from Cell1 (TxRx unit 21); while the UE2's data and DCI is sent from Cell2 (TxRx unit 22) at current subframe. In another subframe, it is possible that the UE1's data and DCI is sent from Cell2 (TxRx unit 22) but the UE2's data and DCI is sent from Cell1 (TxRx unit 21). The selected TP (TxRx unit) may be dynamically updated with a period of 5 ms, 10 ms, etc. For PDCCH generation, the information related to the common scrambling initialization value $c_{init}$ and the above dynamic scheduling results is indicated to the UE's selected TP (TxRx unit). For PDCCH detection, the virtual cell ID or cell ID offset for common scrambling initialization value $c_{init}$ for the CoMP UE group is informed semi-statically to each UE of PDCCH-Config or E-PDCCH-Config by RRC signalling; while, the location of the reserved resource region Rrsv, i.e. the number of OFDM symbols for PDCCH, is indicated dynamically as a L1/L2 signal through PORCH.

1.6) Other Examples

In the above-described examples as shown in FIGS. 8-11, the same CoMP scheme by using same selected TP(s) is used to send the downlink data over PDSCH and the downlink control signal over ePDCCH or PDCCH. However, the CoMP scheme as well as TP(s) can be independently decided for control signal and data transmission. For example, JT is used for data transmission but DPS is used for control signal transmission, considering the limited radio resources.

2. Second Illustrative Embodiment

According to the second illustrative embodiment, inter-eNB CoMP is applied to control signal transmission. Detailed configuration and operation will be described by referring to FIGS. 12-14.

Figure 12:
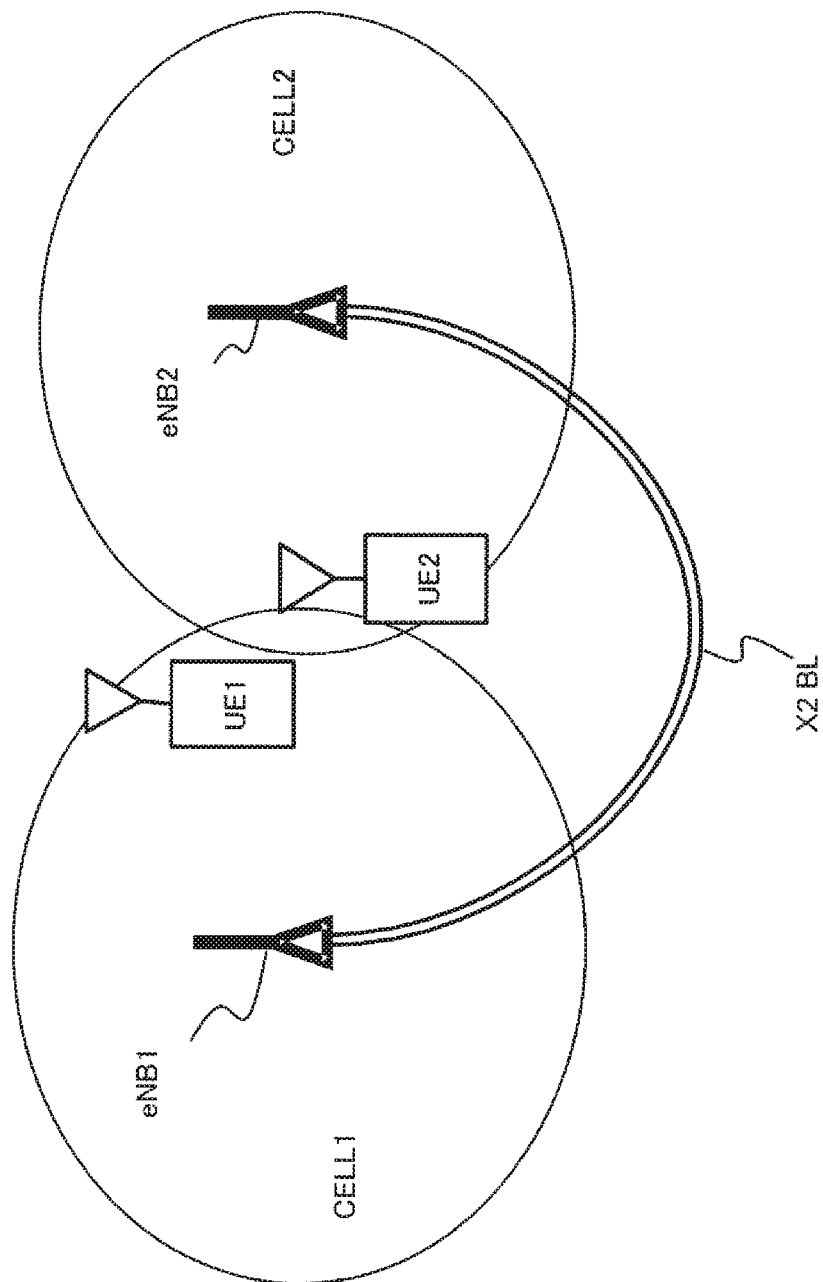
FIG. 12 is a diagram illustrating an example of a radio communication system according to a second illustrative embodiment.

As shown in FIG. 12, eNB1 and eNB2 are connected by X2 backhaul link. Each eNB includes the same functions as those of the controller 10 as shown in FIG. 6. More specifically, as shown in FIG. 13, Each eNB is provided with BL communication section (211, 221), radio transmitter (213, 223); radio receiver (214, 224); and control section (210, 220). The control section (210, 220) has not only the functions for eNB operations as described before but also the functions for inter-eNB CoMP applied to control signal transmission. The BL communication sections 211 and 221 are connected to each other through the X2 backhaul link, allowing the inter-eNB CoMP for control signal transmission. Other function blocks similar to those described with reference to FIG. 6 are denoted by the same reference numerals and their detailed descriptions are omitted.

By using the above-mentioned function blocks, the control section 210, 220 can find the CoMP UEs connected to eNB1 and eNB2, respectively. The UE1 has serving eNB1 and cooperating eNB2; while the UE2 has serving eNB2 and cooperating eNB1. By exchanging information over the X2 backhaul link, the CoMP UEs with the same CoMP cooperating set are grouped at each eNB. For control signal transmission of the UE1 and UE2, the common scrambling initialization value $c_{init}$ is chosen and the shared radio resource region Rrsv is reserved. More specifically, the operations of the control sections 210 and 220 will be described by reference to FIG. 14.

Referring to FIG. 14, at first, when the eNB1 and eNB2 have received an uplink signal from the UE1 and UE2, respectively (operations 501 and 502), the control sections 210 and 220 use information of the received power of uplink sounding reference signal (SRS) or the UE feedback downlink reference signal received power (RSRP) to select the CoMP cooperating set for each UE (operations 503.1, 503.2). After exchanging the information related to each UE's CoMP cooperating set through X2 backhaul between sections 211 and 221, the control sections 210 and 220 group UE1 and UE2 into one CoMP UE group (operations 504.1, 504.2). For this CoMP UE group, the control sections 210 and 220 select a virtual cell ID or cell ID offset or determining the same scrambling initialization value $c_{init}$ for ePDCCH of each UE in the CoMP UE group (operations 505.1, 505.2). The virtual cell ID or cell ID offset can be the same as the ID of one CoMP cooperating cell, i.e., Cell1's ID or Cell2's ID, or a different ID for the sake of interference randomization. The control sections 210 and 220 send the virtual cell ID or cell ID offset to the UE1 and the UE2, respectively (operations 506 and 507). The scrambling sequence is initialized by a common initialization value $c_{init}$ for Cell1 and Cell2 as described before.

Next, by exchanging the information over X2 backhaul, the control sections 210 and 220 reserve the shared radio resource region Rrsv (see FIG. 4A) at both Cell1 and Cell2 for control signal transmission (operations 508.1, 508.2). The control sections 210 and 220 notify the UE1 and UE2 of the location of the shared radio resource region Rrsv (operations 509 and 510).

Next, the control sections 210 and 220 perform the distributed scheduling at eNB1 and eNB2, respectively (operations 511.1, 511.2). Each control section of the eNB1 and eNB2 dynamically assigns the resources for each UE connected to the corresponding eNB. In case of preceding, the PMI as well as RI for each UE needs to be decided. By coordinating the results of distributed scheduling through the X2 backhaul link, the control sections 210 and 220 corporate each other for the data transmission with JT/DPS CoMP. After that, each UE's DCI including the dynamic scheduling results can be aggregated into consecutive CCEs.

For the UE in the CoMP UE group, each eNB allocates the RBs and REs within the reserved radio resource region Rrsv. By exchanging the information over the X2 backhaul link, the coordination among cooperating eNBs is needed for control signal transmission with JT/DPS CoMP. In case of JT CoMP, the same RBs as well as REs are allocated at eNB1 and eNB2 for UE1 and UE2, respectively. In case of DPS, the RBs and REs at one selected eNB is allocated to achieve largest data rate. For coordinating the distributed scheduling results of different cooperating cells, the exchanging messages for the aggregated control signal of a CoMP UE group is relatively smaller than that of separate control signal for different CoMP UEs.

Accordingly, each of the control sections 210 and 220 generates the control signal of the CoMP UE group by multiplexing the CCEs of the UE1's DCI and UE2's DCI first and then scrambling the bit sequence by using the informed virtual cell ID or cell ID offset for generating same scrambling initialization value init for the CoMP UE group (operations 512 and 513).

With the knowledge of the virtual cell ID or cell ID offset for scrambling initialization value $c_{init}$ and the reserved resource region Rrsv, each UE can detect the control signal, by demapping the received signal, demodulating the symbol sequence, and then descrambling the bit sequence (operations 514 and 515). Hereafter, the UE1's DCI and UE2's DCI are blindly detected in the informed reserved resource region Rrsv, respectively. The detailed process of the employment of JT/DPS CoMP on ePDCCH and PDCCH is similar to that of the first to fourth examples, which is not redundantly described here.

3. Additional Statements

The present invention can be applied to a mobile communications system employing coordinated transmission among multiple points to send control signal to multiple UEs.

The present invention may be embodied in other specific forms without departing from the spirit or essential characteristics thereof. The above-described illustrative embodiment and examples are therefore to be considered in all respects as illustrative and not restrictive, the scope of the invention being indicated by the appended claims rather than by the foregoing description, and all changes which come within the meaning and range of equivalency of the claims are therefore intended to be embraced therein. Part or all of the above-described illustrative embodiments can also be described as, but are not limited to, the following additional statements.

REFERENCE SIGNS LIST 10 controller
21, 22 transmission/reception (TxRx) unit
UE1, UE2 user equipment (user terminal)
101 COMP cooperating set selection section
102 COMP UE grouping section
103 scrambling initialization value selection section
104 resource reservation section
105 scheduler
106 backhaul link (BL) communication section
107 control section
210, 220 control section
211, 221 BL communication section
212, 222 control section
213, 223 transmitter
214, 224 receiver
311, 321 transmitter
312, 322 receiver
313, 323 DL signal detection section
314, 324 CSI estimation section

The invention claimed is:

1. A base station comprising:
a memory storing instructions; and
at least one hardware processor configured to execute the instructions to:
scramble, by using a cell ID, a first schedule assignment carried on a first physical downlink control channel, wherein:
the first physical downlink control channel is transmitted in a first space; and
the first space is detected by a plurality of user equipment; and
scramble, by using a parameter which is included in configuration information of a second physical downlink control channel, a second schedule assignment carried on the second physical downlink control channel, wherein:
the second physical downlink control channel is transmitted in a second space; and
the second space is detected by a specific one of the plurality of user equipment.

2. A user equipment (UE) comprising:
a memory storing instructions; and
at least one hardware processor configured to execute the instructions to:
descramble a scrambled first schedule assignment carried on a first physical downlink control channel, in accordance with a cell ID, wherein:
the first physical downlink control channel is transmitted in a first space; and
the first space is detected by a plurality of user equipment that includes the UE; and
descramble a scrambled second schedule assignment carried on a second physical downlink control channel, in accordance with a parameter included in configuration information of the second physical downlink control channel, wherein:
the second physical downlink control channel is transmitted in a second space; and
the second space is detected by the UE.

3. A communication method of a base station, comprising:
scrambling, by using a cell ID, a first schedule assignment carried on a first physical downlink control channel, wherein:
the first physical downlink control channel is transmitted in a first space; and
the first space is detected by a plurality of user equipment; and
scrambling, by using a parameter which is included in configuration information of a second physical downlink control channel, a second schedule assignment carried on the second physical downlink control channel, wherein:
the second physical downlink control channel is transmitted in a second space; and
the second space is detected by a specific one of the plurality of user equipment.

4. The communication method according to claim 3, further comprising:
transmitting, to the specific user equipment, the configuration information on a radio resource control signaling.

5. The communication method according to claim 3, wherein the parameter is independent of the cell ID.

6. The communication method according to claim 3, wherein the cell ID is used for a scrambling initialization value $C_{init,1}$ as follows:

$$C_{init,1} = \left\lfloor \frac{n_s}{2} \right\rfloor 2^9 + N_{ID,1},$$

where the $N_{ID,1}$ is the cell ID and the $n_s$ is a slot number within a radio frame, and the parameter is used for a scrambling initialization value $C_{init,2}$ as follows:

$$C_{init,2} \left\lfloor \frac{n_s}{2} \right\rfloor 2^9 + N_{ID,2},$$

where the $N_{ID,2}$ is the parameter.

7. The communication method according to claim 3, further comprising:
transmitting, to the specific user equipment, the scrambled first schedule assignment; and
transmitting, to the specific user equipment, the scrambled second schedule assignment.

8. The communication method according to claim 3, further comprising at least one of:
transmitting, to the specific user equipment, first downlink data on a first physical downlink shared channel (PDSCH) based on the first schedule assignment;
receiving, from the the specific user equipment, first uplink data on a first physical uplink shared channel (PUSCH) based on the first schedule assignment;
transmitting, to the the specific user equipment, second downlink data on a second PDSCH based on the second schedule assignment; or
receiving, from the the specific user equipment, second uplink data on a second PUSCH based on the second schedule assignment.

9. The communication method according to claim 3, wherein
the first physical downlink control channel and the second physical downlink control channel are allocated to different resource position in a subframe.

10. The communication method according to claim 3, wherein
the parameter is single ID selected from a plurality of IDs.

11. A communication method of a user equipment (UE), comprising:
descrambling a scrambled first schedule assignment carried on a first physical downlink control channel, in accordance with a cell ID, wherein:
the first physical downlink control channel is transmitted in a first space; and
the first space is detected by a plurality of user equipment that includes the UE; and
descrambling a scrambled second schedule assignment carried on a second physical downlink control channel, in accordance with a parameter included in configuration information of the second physical downlink control channel, wherein:
the second physical downlink control channel is transmitted in a second space; and
the second space is detected by the UE.

12. The communication method according to claim 11, further comprising:
receiving, from a base station, the configuration information on a radio resource control signaling.

13. The communication method according to claim 11, further comprising:
receiving, from a base station, the scrambled first schedule assignment; and
receiving, from the base station, the scrambled second schedule assignment.

14. The communication method according to claim 11, wherein the parameter is independent of the cell ID.

15. The communication method according to claim 11, wherein
the cell ID is used for a scrambling initialization value $C_{init,1}$ as follows:

$$C_{init,1} = \left\lfloor \frac{n_s}{2} \right\rfloor 2^9 + N_{ID,1},$$

where the $N_{ID,1}$ is the cell ID and the $n_s$ is slot number within a radio frame, and
the parameter is used for a scrambling initialization value $C_{init,2}$ as follows:

$$C_{init,2} = \left\lfloor \frac{n_s}{2} \right\rfloor 2^9 + N_{ID,2},$$

where the $N_{ID,2}$ is the parameter.

16. The communication method according to claim 11, further comprising at least one of:
receiving, from a base station, first downlink data on a first physical downlink shared channel (PDSCH) based on the first schedule assignment;
transmitting, to the base station, first uplink data on a first physical uplink shared channel (PUSCH) based on the first schedule assignment;
receiving, from the base station, second downlink data on a second PDSCH based on the second schedule assignment; or
transmitting, to the base station, second uplink data on a second PUSCH based on the second schedule assignment.

17. The communication method according to claim 11, wherein
the first physical downlink control channel and the second physical downlink control channel are allocated to different resource positions in a subframe.

18. The communication method according to claim 11, wherein the parameter is single ID selected from a plurality of IDs.

* * * * *